(12) United States Patent
Carter et al.

(10) Patent No.: US 10,951,493 B2
(45) Date of Patent: Mar. 16, 2021

(54) DETERMINING WIRELESS NETWORK PERFORMANCE

(71) Applicant: Global Wireless Solutions, Inc., Dulles, VA (US)

(72) Inventors: Paul P. Carter, Paeonian Springs, VA (US); John Gladhill, Purcellville, VA (US); Habib Huq, Ashburn, VA (US)

(73) Assignee: Global Wireless Solutions, Inc., Dulles, VA (US)

( * ) Notice: Subject to any disclaimer, the term of this patent is extended or adjusted under 35 U.S.C. 154(b) by 0 days.

(21) Appl. No.: 16/428,472

(22) Filed: May 31, 2019

(65) Prior Publication Data

US 2020/0322820 A1 Oct. 8, 2020

Related U.S. Application Data

(60) Provisional application No. 62/828,862, filed on Apr. 3, 2019.

(51) Int. Cl.
*H04L 12/24* (2006.01)
*H04W 24/08* (2009.01)
(Continued)

(52) U.S. Cl.
CPC ..... *H04L 41/5067* (2013.01); *G06Q 30/0201* (2013.01); *H04L 41/5032* (2013.01);
(Continued)

(58) Field of Classification Search
CPC combination set(s) only.
See application file for complete search history.

(56) References Cited

U.S. PATENT DOCUMENTS

| 7,242,668 B2 | 7/2007 | Kan et al. |
| 7,392,017 B2 | 6/2008 | Chu et al. |

(Continued)

FOREIGN PATENT DOCUMENTS

| CN | 1275430 C | 9/2006 |
| CN | 1832434 A | 9/2006 |

OTHER PUBLICATIONS

Lin Zhang et al., "UNOTest: An efficient traffic performance test platform in heterogeneous networks", 2013 16th International Symposium on Wireless Personal Multimedia Communications (WPMC), Jun. 24-27, 2013, Atlantic City, NJ, 5 pages.

(Continued)

*Primary Examiner* — Xavier S Wong
(74) *Attorney, Agent, or Firm* — Banner & Witcoff, Ltd.

(57) ABSTRACT

Aspects described herein relate to various methods, systems and apparatuses that may improve methods of determining network performance. One or more aspects relate to performing one or more network tests based on a controller device and one or more measurement devices. The controller device may be configured to determine one or more network tests and initiate performance of the one or more network tests. The one or more measurement devices may be configured to perform the one or more network tests. One or more additional aspects may relate to determining one or more rankings of wireless networks. A ranking may be determined based on measurement data that is associated with aspects of network performance, based on results of one or more surveys, based on one or more user types, and/or based on weights that adjust the importance of factors including the measurement data and the results of a survey.

20 Claims, 25 Drawing Sheets

(51) Int. Cl.
*G06Q 30/02* (2012.01)
*H04W 76/15* (2018.01)
*H04W 4/80* (2018.01)
*H04W 24/10* (2009.01)

(52) U.S. Cl.
CPC ...... *H04L 41/5058* (2013.01); *H04L 41/5096* (2013.01); *H04W 4/80* (2018.02); *H04W 24/08* (2013.01); *H04W 24/10* (2013.01); *H04W 76/15* (2018.02)

(56) References Cited

U.S. PATENT DOCUMENTS

| | | | |
|---|---|---|---|
| 7,865,194 B2 | 1/2011 | Roskowski | |
| 7,929,457 B2 | 4/2011 | Healy et al. | |
| 8,064,391 B2 | 11/2011 | Kozisek et al. | |
| 8,515,015 B2 | 8/2013 | Maffre et al. | |
| 8,582,458 B2 | 11/2013 | Robbins et al. | |
| 9,807,613 B2 | 10/2017 | Egner et al. | |
| 9,883,049 B1 | 1/2018 | Warner | |
| 10,123,223 B1 | 11/2018 | Ford et al. | |
| 2005/0107990 A1* | 5/2005 | Monk | G06F 11/2294 702/188 |
| 2007/0064634 A1 | 3/2007 | Huotari et al. | |
| 2010/0157823 A1 | 6/2010 | Li et al. | |
| 2010/0246544 A1 | 9/2010 | Brisebois et al. | |
| 2010/0268575 A1 | 10/2010 | McCauley | |
| 2012/0042213 A1* | 2/2012 | Zimmerman | G06F 11/2294 714/46 |
| 2014/0104291 A1 | 4/2014 | Rutz | |
| 2014/0355457 A1* | 12/2014 | Huang | H04W 24/10 370/252 |
| 2015/0049630 A1 | 2/2015 | Kritt et al. | |
| 2015/0131483 A1 | 5/2015 | Colban et al. | |
| 2015/0245259 A1* | 8/2015 | Marcum | H04W 36/00837 455/437 |
| 2015/0373574 A1 | 12/2015 | Gordon et al. | |
| 2015/0382212 A1* | 12/2015 | Elliott | H04W 24/02 370/252 |
| 2016/0073336 A1 | 3/2016 | Geller | |
| 2016/0127921 A1 | 5/2016 | Bhatia et al. | |
| 2016/0174081 A1 | 6/2016 | Lau | |
| 2017/0339584 A1 | 11/2017 | Ketonen et al. | |
| 2017/0339589 A1* | 11/2017 | Reijonen | H04W 24/08 |
| 2018/0091935 A1* | 3/2018 | Renaldi | H04L 67/18 |
| 2019/0078878 A1* | 3/2019 | Ding | G06F 16/95 |
| 2019/0132814 A1* | 5/2019 | Jiang | G01S 13/765 |

OTHER PUBLICATIONS

Ashkan Nikravesh, et al., 2015, Mobilyzer: An Open Platform for Controllable Mobile Network Measurements, In Proceedings of the 13th Annual International Conference on Mobile Systems, Applications, and Services (MobiSys 15), ACM, New York, NY, USA, 389-404. DOI: https://doi.org/10.1145/2742647.2742670.

Matrium Technologies, Industry Leader in ANZ's Network Testing Market, Matrium Technologies, Australia, printed Nov. 27, 2018, https://matrium.com.au/network-testing/.

Quality of Service Parameters for Internet Service Provision, Final Report, prepared for: European Commission, DG Information Society, Aug. 2000.

SpeedOf.Me, v. 2.9.21, Copyright 2011-2018, undated, https://speedof.me/.

May 15, 2020—U.S. Non-Final Office Action—U.S. Appl. No. 16/428,506.

Nov. 27, 2020—(US) Final Office Action—U.S. Appl. No. 16/428,506.

* cited by examiner

DETERMINING WIRELESS NETWORK PERFORMANCE

CROSS-REFERENCE TO RELATED APPLICATIONS

The present application claims the benefit of U.S. provisional application No. 62/828,862, filed Apr. 3, 2019, and having the same title. The above-mentioned application is incorporated by reference herein in its entirety.

BACKGROUND

Wireless networks may provide a variety of services to devices. For example, a wireless network may provide, among other services, a video streaming service, a voice call service, an Internet data service, and a text messaging services. Users may enter a contractual relationship with a service provider so that the users' devices are able to connect to the service provider's wireless network and consume the services. Users may choose a service provider based on the performance of the service provider's wireless network. For example, one wireless network may have better coverage than another wireless network in the same geographic area, and a user may choose a service provider based on which wireless network has better coverage. Service providers may advertise where their wireless network performs better than competitor's wireless networks. Users and service providers may both find that conventional methods for determining wireless network performance are inadequate.

BRIEF SUMMARY

This summary is provided to introduce a selection of concepts in a simplified form that are further described below in the Detailed Description. This Summary is not intended to identify key features or essential features of the various embodiments, nor is it intended to be used to limit the scope of any claim.

There is an ever present need to improve methods of determining network performance. To address one or more shortcomings of conventional methods of determining network performance, aspects described herein relate to various methods, systems and apparatuses that can be used to perform one or more network tests based on a controller device and one or more measurement devices. The controller device may be configured to determine one or more network tests and initiate performance of the one or more network tests. The one or more measurement devices may be configured to perform the one or more network tests based on data communication with a wireless network. Further, the one or more measurement devices may be configured to, based on performance of the one or more network tests, determine measurement data that indicates performance of the wireless network. The measurement data may be used as a basis for determining network performance, such as a ranking of wireless networks.

Additional aspects may relate to determining one or more rankings of wireless networks. A ranking may be determined based on measurement data that is associated with aspects of network performance. The measurement data may be received from multiple sources (e.g., one or more measurement devices, one or more servers associated with service providers, or one or more other devices that determine measurement data). A ranking may be determined based on results determined based on one or more surveys and/or other performance indicators. A survey may include questions asking for a user's satisfaction with their current service provider, questions asking for a user's preferences, such as a user's usage of wireless networks. A ranking may be determined based on a user type including, for example, a consumer that primarily uses wireless networks for private use and/or a business user that primarily uses wireless networks for business use. A ranking may be determined based on weights that adjust the importance of individual factors including, for example, weights that adjust the level of importance given to measurement data and results of a survey.

BRIEF DESCRIPTION OF THE DRAWINGS

Some example embodiments are illustrated by way of example and not limited in the accompanying figures in which like reference numerals indicate similar elements and in which.

DETAILED DESCRIPTION

Figure 1:
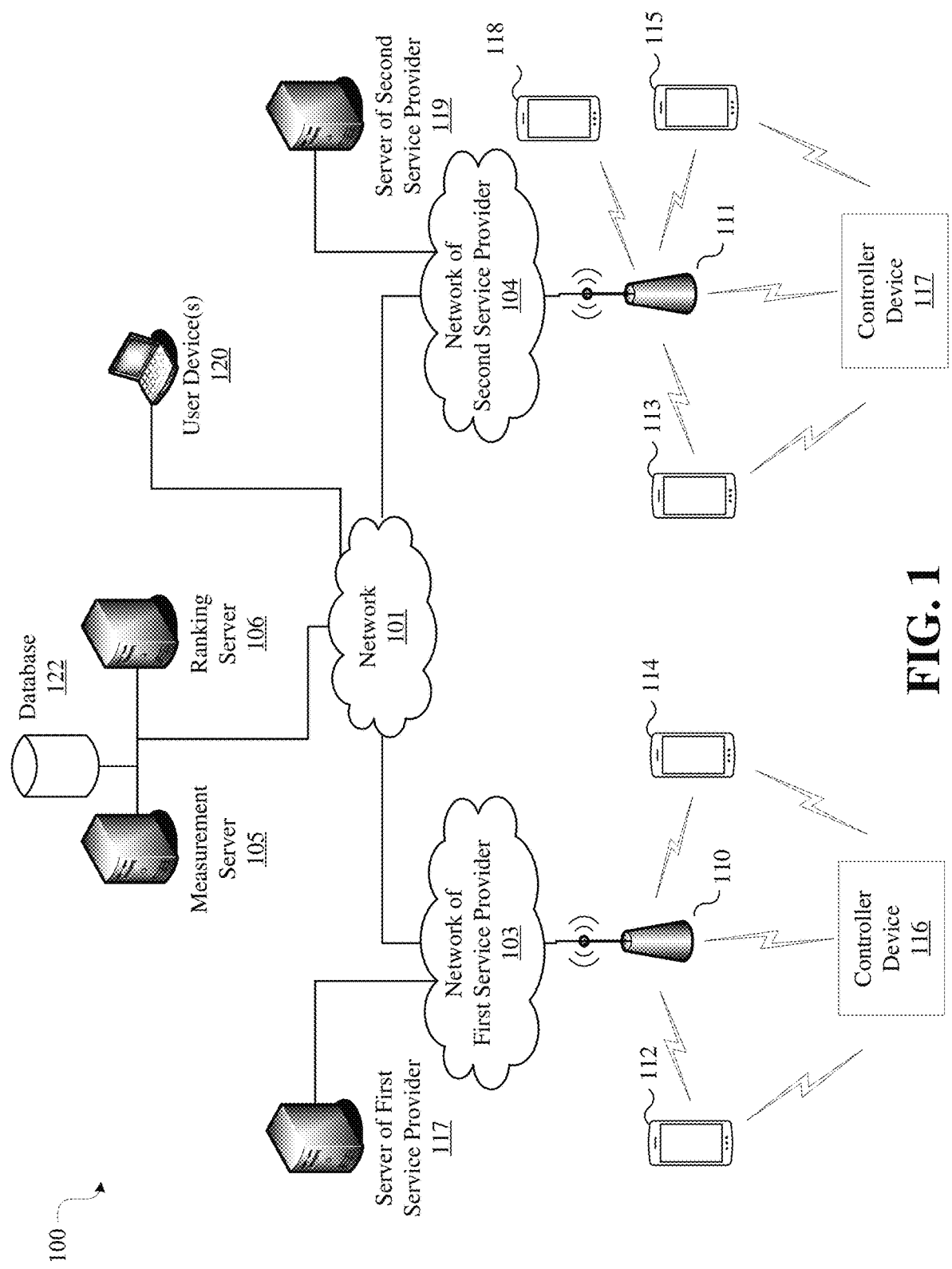
FIG. 1 shows an example block diagram of a system for determining network performance.

In the following description of various illustrative embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Wireless networks provide users with a variety of services. For example, a wireless network may provide, among other services, video streaming services, voice call services, Internet data services, text messaging services, and other data services. Users may choose a wireless network based on many different aspects of the wireless network's performance (e.g., coverage, throughput, reliability, etc.). Users, however, may individually value the aspects of a wireless network's performance differently from each other. For example, one user may prefer a wireless network's coverage over a wireless network's throughput. Another user may prefer a wireless network's voice call reliability over the wireless network's performance of other data services. Both users and service providers may benefit from receiving information that indicates a wireless network's performance and that determines the wireless network's performance based on user preferences.

As mentioned above, one conventional method for determining a wireless network's performance is to measure the wireless network's data speed and reliability in one or more geographic areas. The wireless network's performance may be ranked relative to other wireless networks in the one or more geographic areas by comparing the wireless network's metrics for data speed and reliability against similar metrics of the other wireless networks. A wireless network's data speed and/or reliability may not provide an accurate representation of the overall wireless network's performance. For example, the wireless network may be arranged or configured in such a way that certain types of services perform better than other services (e.g. voice call services may perform more reliably than video streaming services). The wireless network may also have other factors or criteria that are relevant to its performance. Service coverage, audio or video quality, and the performance of individual services, for example, are all factors or criteria that provide an indication of a wireless network's performance. Further, metrics may be determined as a way to measure a factor or criterion (e.g., an upload speed, as measured by a device connected to the wireless network, may be a measurement of a wireless network's data speed). One or more examples described herein may relate to using one or more factors, criteria, or metrics that improve methods for determining network performance.

A number of examples of factors, criteria, and metrics will be discussed throughout this disclosure. As a general introduction, one or more of the factors, criteria, or metrics may, for example, indicate or otherwise be associated with a network's data speed or a network's reliability. A network's data speed may refer to the volume of data downloaded and/or uploaded via the network over a unit of time (e.g., megabits per second). A network's reliability may refer to the ability for a data communication to be initiated, performed, and/or completed via the network. Reliability may be indicated by various metrics including, for example, delay metrics, packet loss metrics, error rates, and the like. Further, the factors, criteria, or metrics may be associated with a service. For example, a metric for a network's data speed may be associated with a video data service and indicate a volume of video data uploaded or downloaded via the network over a unit of time. A metric for a network's reliability may be associated with a video data service and indicate an ability for the network to initiate, perform and/or complete the video data service (e.g., a delay time before a video data service begins streaming at a user device). These and other examples will be discussed throughout this disclosure and in connection with the accompanying figures.

Conventional methods of determining network performance may not verify that network performance data is a reliable or accurate indication of a wireless network's performance. For example, a computing device may perform one or more data communications with a wireless network as a way to determine one or more network performance metrics. However, due to some occurrence with the computing device, wireless network, or the one or more data communications (e.g., interference may cause packet losses), the one or more data communications may have taken abnormally long to complete. Any metric determined based on the time to complete the one or more data communications may be an unreliable or inaccurate indication of the wireless network's performance. By identifying and removing any data determined to be unreliable or inaccurate, methods for determining network performance can be improved. One or more examples described herein may relate to identifying and removing unreliable or inaccurate data based on a verification of received network performance data.

Conventional methods of determining network performance may not account for users' differing preferences or levels of satisfaction with their current service provider. For example, a user that primarily consumes services for private use may have different preferences than a user that primarily consumes services for business use. As one example, one user may prefer a fast and reliable video streaming service; another user may prefer a reliable voice call service; and another user may prefer a reliable Internet data service. Further, a user may or may not be satisfied with the quality or level of service provided by their current network provider. Accordingly, one or more examples described herein may relate to selecting or otherwise determining factors, criteria, or metrics based on one or more users' preferences or levels of satisfaction. By selecting or otherwise determining factors, criteria, or metrics based on one or more user's preferences or levels of satisfaction, methods for determining network performance can be improved. Further, one or more examples may relate to determining factors, criteria, or metrics based on a consumer's preferences or level of satisfaction. A consumer may refer to a user that primarily consumes services for private use (e.g., in connection with a person's social, leisure, or family activities). One or more examples may relate to determining factors, criteria, or metrics based on a business user's preferences or level of satisfaction. A business user may refer to a user that primarily consumes service for business use (e.g., in connection with a person's employment). Further, a preference or level of satisfaction may be associated with a service (e.g., the requirement or level of satisfaction may be associated with a video data service, a voice call service, or the like).

Based on the above, aspects described herein may improve methods for determining network performance. For example, an improvement may be based on determining one or more factors, criteria, or metrics that provide an indication of a wireless network's performance. An improvement may be based on verifying network performance data or otherwise identifying unreliable or inaccurate data. An improvement may be based on one or more factors, criteria, or metrics that are determined based on a preference or level of satisfaction associated with a service. These and other improvements will be apparent based on the discussion below and the accompanying figures.

Figure 3:
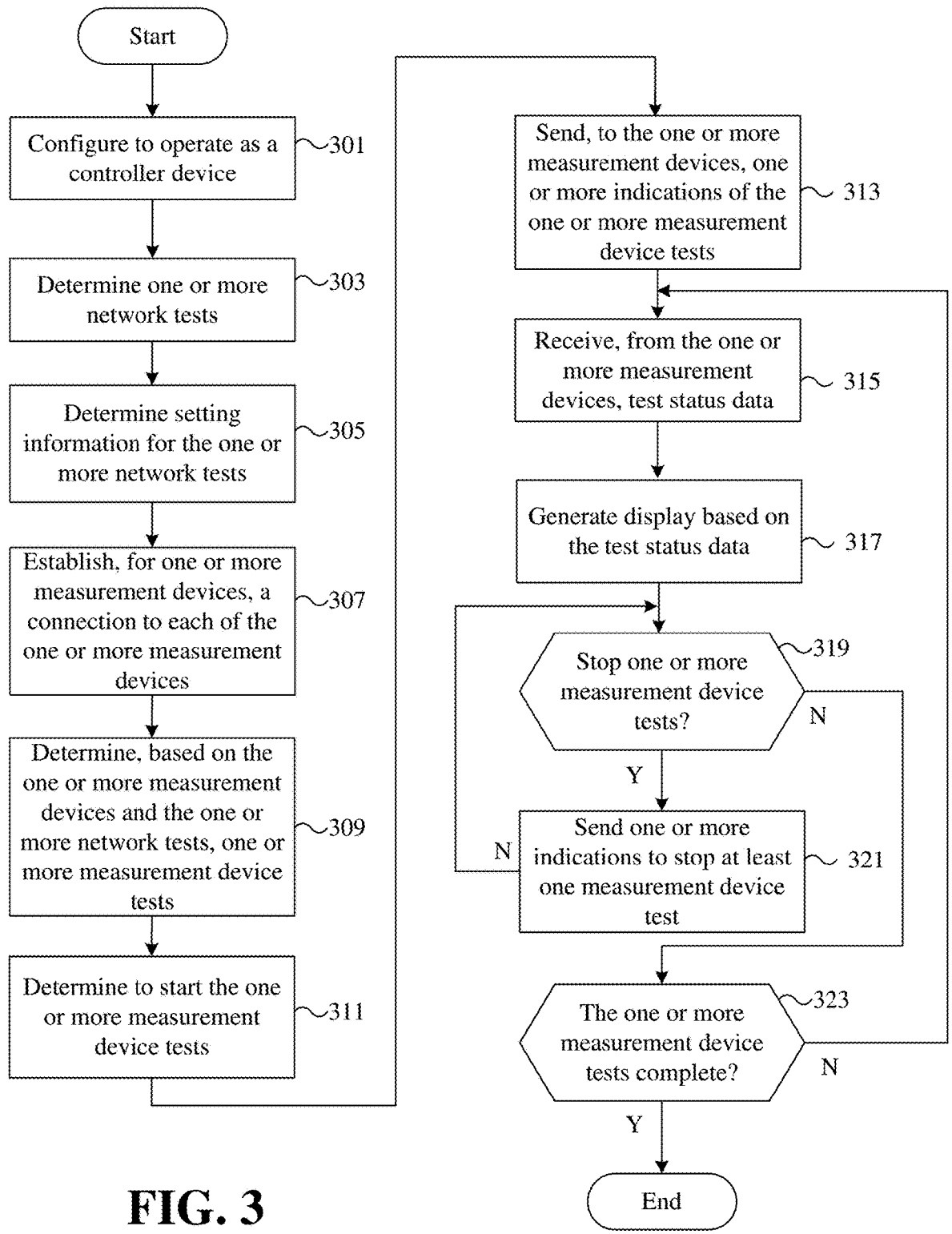
FIG. 3 shows an example method for controlling one or more network tests.
Figure 4:
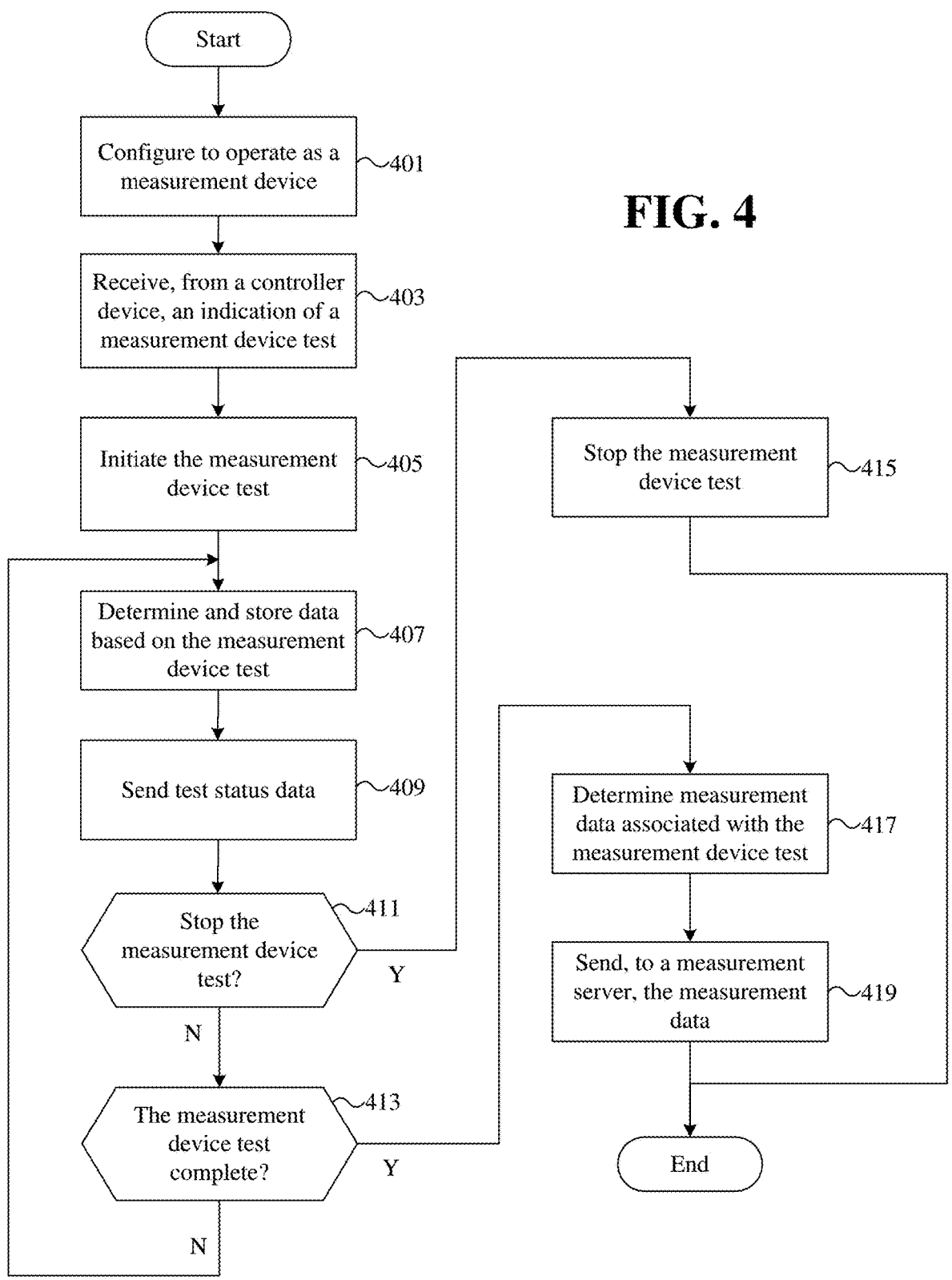
FIG. 4 shows an example method for performing one or more network tests.
Figure 5:
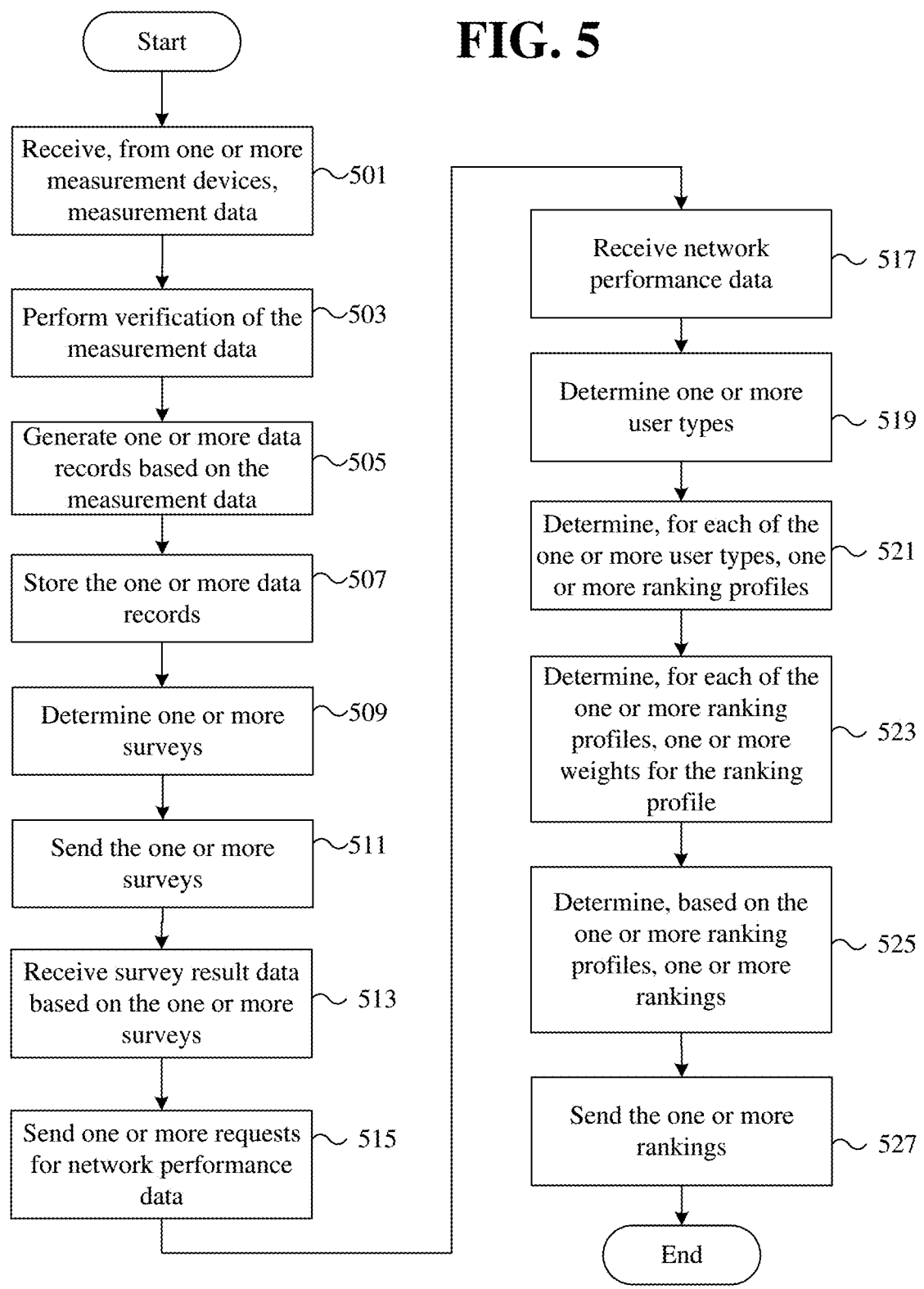
FIG. 5 shows an example method for receiving data based on the one or more network tests and for determining one or more network rankings.
Figure 6:
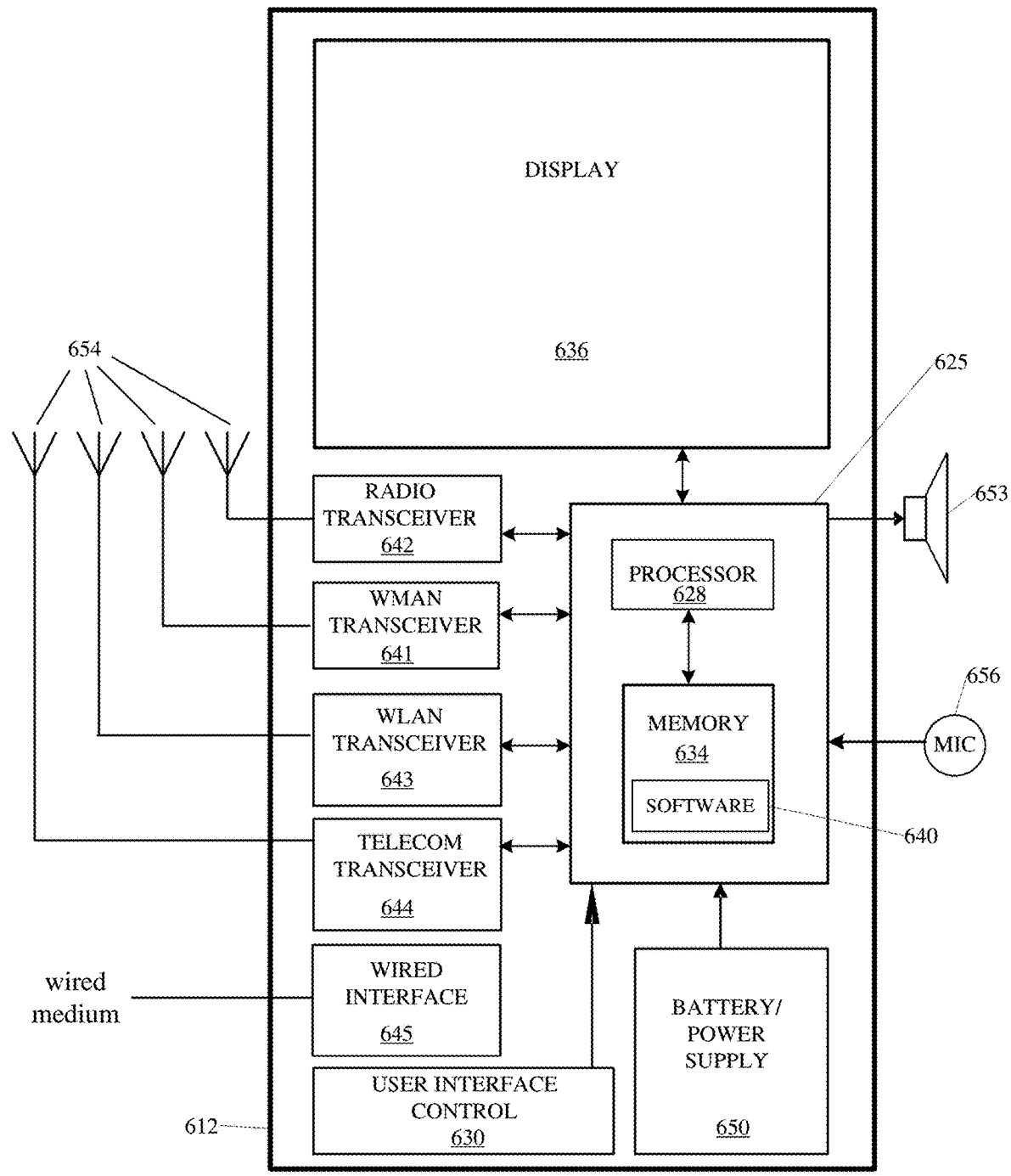
FIG. 6 shows an apparatus that may be used to implement one or more aspects described herein.

As a general introduction to the discussion below and the accompanying figures, FIG. 1 shows an example block diagram of a system for determining network performance. The system may be used to implement one or more of the improvements to methods for determining network performance. FIGS. 2A-2E show an example flow for determining network performance based on measurement data that was determined based on one or more tests, one or more surveys that indicate a preference or level of satisfaction associated with a service, or other network performance data. The example flow may provide one or more examples of the improvements to methods for determining network performance described herein. FIGS. 3-5 show example methods for performing various aspects associated with determining network performance. The example methods may provide one or more examples of the improvements to methods for determining network performance described herein. FIG. 6 shows an example apparatus that may be used to implement one or more aspects described herein including, for example, one or more aspects associated with the improvements to methods for determining network performance described herein. FIGS. 7A-7G and 8A-8H show example displays that may provide one or more examples of the improvements to methods for determining network performance described herein.

FIG. 1 shows an example block diagram of a system for determining network performance. FIG. 1 depicts two example wireless networks 103 and 104, and a number of devices that may be used for determining the wireless networks' performance. Each of the two wireless networks 103 and 104 is depicted in FIG. 1 as being associated with its own service provider. As depicted in FIG. 1, network 103 is associated with a first service provider and network 104 is associated with a second service provider. The first service provider and the second service provider may be different corporate entities that provide, via the associated wireless network, services to one or more users. Wireless networks 103 and 104 may provide services to the same geographic area (e.g., two wireless networks that provide services to a city) or may provide services to different geographic areas (e.g., wireless network 103 may provide services to a portion of New York, and wireless network 104 may provide services to a portion of Virginia). The example showing two different wireless networks and two different service providers are only an example. There could be more than two wireless networks and/or more than two service providers (e.g., three wireless networks may provide services to a geographic area; each of the three or more wireless networks may be associated with its own service provider). There could be fewer wireless networks and/or fewer service providers (e.g., two wireless networks of a single service provider may be providing services to different geographic areas; a single wireless network of a service provider may be providing services to a geographic area).

Both wireless networks 103 and 104 may be or include a radio access network (RAN), a cellular network, or some other type of mobile telecommunication network. Each wireless network 103 and 104 may comprise RAN equipment and a core network operated by the associated service provider. The RAN equipment and the core network may be configured to communicate with user devices and provide services to the user devices. The RAN equipment may include, for example, one or more base transceiver stations (BTSs) or one or more access points. As depicted in FIG. 1, wireless network 103 may include a BTS or access point 110, and wireless network 104 may include a BTS or access point 111. Based on the BTS or access point, the RAN equipment may be configured to communicate wirelessly with nearby devices. As depicted in FIG. 1, wireless network 103, based on the BTS or access point 110, may communicate with devices 112, 114, and 116. Wireless network 104, based on the BTS or access point 111, may communicate with devices 113, 115, 117, and 118. The wireless communication with the RAN equipment may be performed according to a wireless standard (e.g., third generation (3G), fourth generation (4G), or fifth generation (5G) mobile telecommunications technology). Each of devices 112-118 may be, for example, a mobile phone, a tablet device, or some other computing device capable of communicating with a wireless network via a wireless standard.

The devices 112-118 may be configured to send one or more data communications for transport via the wireless network 103 or 104. Once a data communication is received by the RAN equipment of the wireless network 103 or 104, the data communication may be processed by the core network of the wireless network 103 or 104, and routed to its intended destination. In some instances, the intended destination may be outside the core network and, accordingly, may be routed via one or more other networks including, for example, the Internet, a local area network, a wide area network, and the like. FIG. 1 depicts the one or more other networks as network 101. Accordingly, network 101 may include the Internet, one or more local area networks, one or more wide area networks, one or more one or more wired networks, one or more wireless networks, or one or more other types of networks. As examples of intended destinations of a data communication, FIG. 1 depicts measurement server 105, ranking server 106, and one or more user devices 120. Details on the types of data communications that can be sent to the measurement server 105, ranking server 106 and the one or more user devices 120 may be discussed below.

The devices 112-118 may be configured to send one or more data communications to each other. Further, the devices 112-118 may be configured to send the one or more data communications based on a wireless technology different from the wireless networks 103 and 104. For example, the devices 112-118 may be configured to send the one or more data communications based on BLUETOOTH wireless technology, ZIGBEE wireless technology, or some other short wavelength wireless technology. Details on the types of data communications that can be sent among the devices 112-118 may be discussed below.

Devices, such as the measurement server 105, the ranking server 106, and the one or more user devices 120, may be configured to send one or more data communications to the devices 112-118. The one or more data communications may be transported via the wireless networks 103 or 104. Details on the types of data communications that may be sent by the measurement server 105, the ranking server 106, and the one or more user devices 120 may be discussed below.

In addition to communicating with the devices 112-118, the measurement server 105 and the ranking server 106 may be configured to communicate with database 122, the one or more user devices 120, the server 121 of the first service provider, and the server 119 of the second service provider. Details on the types of communications that may be sent from the measurement server 105 and the ranking server 106 and to one or more of the database 122, the one or more user devices 120, the server 121, and the server 119 may be discussed below.

As a general introduction to the types of data communications that can be sent and/or received from the various devices depicted in FIG. 1, the example of FIG. 1 will be briefly discussed in terms of some aspects for determining network performance. For example, devices 112, 114, and 116 may be configured to perform one or more network tests that determines one or more metrics that indicate the performance of wireless network 103. Devices 113, 115, and 117 may be configured to perform one or more network tests that determines one or more metrics that indicate the performance of wireless network 104. Each of devices 112-115 may be configured to operate as a measurement device and the one or more network tests may be performed as part of a measurement device's measurement device test. Based on the devices 112 and 114 performing its measurement device test, the one or more metrics may indicate, for example, a data speed or reliability of a video streaming service provided via wireless network 103. The one or more metrics that indicate the data speed or reliability of the video streaming service may be determined based on one or more data communications received or sent by the devices 112 and 114 via the wireless network 103. Based on the devices 113 and 115 performing its measurement device test, the one or more metrics may indicate, for example, a data speed or reliability of a voice call service provided via wireless network 104. The one or more metrics that indicate the data speed or reliability of the voice call service may be determined based on one or more data communications received or sent by the devices 113 and 115 via the wireless network 104. The devices 112-115 may be operating one or more operating systems (e.g., devices 112 and 113 may be operating a version of the ANDROID operating system, and devices 114 and 115 may be operating a version of the iOS operating system).

For clarity, the one or more metrics determined based on one or more measurement device tests may be referred to herein as measurement data. Additionally and for clarity, a measurement device test may be defined as a set of one or more network tests (e.g., a test for a data speed of a video streaming service; a test for a reliability of a voice call service) that is assigned or associated with a particular device of the devices 112-115. For example, device 112 may, as its measurement device test, be assigned or associated with a first set of one or more network tests. Device 114 may, as its measurement device test, be assigned or associated with a second set of one or more network tests. A network test may, when performed, send or receive one or more data communications to/from a wireless network, and based on those communications, measurement data may be determined that, for example, indicates data speed, reliability, or other indication of network performance for the wireless network.

Controller devices 116 and 117 may be configured to establish connections with devices 112-115; perform one or more operations that determine one or more network tests; and determine, based on the one or more network tests, measurement device tests that are to be performed by the devices 112-115. For example, controller device 116 may be configured to establish a BLUETOOTH connection with each of devices 112 and 114. The controller device 116 may be configured to, based on one or more user interactions with a user interface generated by the controller device 116, determine one or more network tests; determine, based on the one or more network tests, one or more measurement device tests that are to be performed by the devices 112 and 114; cause the devices 112 and 114 to perform the one or more measurement device tests; and display status information associated with the one or more measurement device tests. The controller device 116 may be configured to cause the devices 112 and 114 to perform the one or more measurement device tests based on a common window (e.g., devices 112 and 114 may begin the tests at the same or similar time, such as within 1 second of each other; may perform the tests in parallel or synchronously; and may complete the tests at the same or similar time). Similar to controller device 116, the controller device 117 may be configured to, based on one or more user interactions with a user interface generated by the controller device 117, determine one or more network tests; determine, based on the one or more network tests, one or more measurement device tests that are to be performed by the devices 113 and 115; cause the devices 113 and 115 to perform the one or more measurement device tests; and display status information associated with the one or more measurement device tests. The controller device 117 may be configured to cause the devices 113 and 115 to perform the one or more measurement device tests based on a common window (e.g., devices 113 and 115 may begin the tests at the same or similar time, such as within 1 second of each other; may perform the tests in parallel or synchronously; and may complete the tests at the same or similar time). FIGS. 7A-7G and 8A-8H provide example displays of a user interface of a controller device.

As the one or more measurement device tests are being performed and/or after the one or more measurement device tests are complete, the devices 112-115 may send data to one or more of the controller 116, controller 117, the measurement server 105, and the ranking server 106. For example, the devices 112 and 114 may be sending test status data associated with the one or more measurement device tests to the controller device 116. The devices 112 and 114 may be sending measurement data and/or other test result data to the measurement server 105. The devices 113 and 115 may send test status data associated with the one or more measurement device tests to the controller device 117. The devices 113 and 115 may send measurement data and/or other test result data to the measurement server 105. The other test result data may include, for example, an indication of the device's operating system (e.g., an indication of an ANDROID operating system, or an indication of an iOS operating system), an indication of a geographic area where the one or more network tests were performed (e.g., coordinate data generated by a global positioning system (GPS) of the devices 112-115), and/or an indication of the service provider associated with the wireless network that the device was communicating with (e.g, an indication of the first service provider or the second service provider). The test status data may include similar data to the measurement data and the other test result data. Upon receipt, the controller devices 116 and 117 may cause display of the test status data. The measurement server 105 may verify the measurement data or other test result data (e.g., identify portions of the measurement data that is inaccurate or unreliable, and remove the inaccurate or unreliable data from the measurement data), generate one or more data records based on the measurement data, and store the one or more data records in the database 122.

From the above, devices 112-117 may be configured to perform one or more measurement device tests and send measurement data or other test result data to the measurement server 105. The measurement data or other test result data may be only one of the types of network performance data accessible to devices of the system. For example, device 118 may be configured with a software application that monitors service usage, determines one or more metrics based on the service usage, and sends its own measurement data to the measurement server 105. Further, the software application may be a browser plug-in that monitors data communication performed by a browser installed on the device 118. The plug-in may be configured to monitor data communications with one or more social media platforms. Based on the monitored data communication, the device 118 may determine one or more metrics including, for example, an upload speed or download speed for particular types of data traffic or data associated with particular services (e.g., upload or download speeds for a video streaming service), and may send its own measurement data to the measurement server 105. Upon receipt, the measurement server 105 may verify the measurement data, generate one or more data records based on the measurement data, and store the one or more data records in the database 122. As another example, a service provider (e.g., the first service provider of FIG. 1) may be determining its own network performance data. One or more devices of the RAN equipment or the core network (e.g., the BTS or access point 110, or the core network of the wireless network 103) may be configured to monitor for particular types of data traffic or data associated with particular services (e.g., monitoring for data associated with video streaming services). Based on the monitoring, one or more metrics may be determined (e.g., routing times of data associated with a video streaming server may be determined by the server 121) and stored. Later, ranking server 106 may request the one or more metrics from the server 121 and used as a basis for determining a ranking of network performance (e.g., a ranking that indicates the relative performance of wireless network 103 and wireless network 104 for video streaming services).

The ranking server 106 may be configured to, among other things, determine one or more surveys associated with one or more types of users. A survey may include one or more questions regarding a user's preferences, such as a user's daily usage of services. Some example questions, for example, may include a question asking for identification of the user's most-used service or a question asking for identification of the service that is most important to the user. Each question may be associated with multiple choices for a user to select (e.g., a listing of services) that allow the user to identify their answer to the question. A survey may include one or more questions associated with a user's satisfaction with their current service provider. The one or more questions may be based on one or more services including, for example, a video data service, a voice call service, Internet data service, image data service, and the like. Some example questions, for example, may include a question asking whether the user is satisfied with their voice call service's call drop rate, their voice call service's coverage, their Internet data service's speed, and/or their video streaming service's quality. Each question may be associated with multiple choices for a user to select (e.g., very satisfied, fairly satisfied, fairly unsatisfied, very unsatisfied, do not know) that allow the user to indicate their level of satisfaction for the service. A survey may include on or more questions associated with a user type (e.g., a consumer or business user). One example question may include a question asking what the user primarily uses services for (e.g., whether the user primarily uses services for business or private use). The survey may include one or more questions for a performance indicator associated with a wireless network. The questions, for example, may be based on one or more key performance indicators associated with a wireless network or the wireless network's service provider. Each question may be associated with multiple choices for a user to select that allow the user to indicate their primary type (e.g., indicate whether the user primarily uses services for business or private use). When completed by the user, the results of the survey (e.g., the survey and their associated answers) may be sent back to the ranking server 106. Based on the results, the ranking server 106 may determine one or more network performance metrics that will be used as a basis for determining a ranking and/or may determine one or more weights that will be used as a basis for determining a ranking. Further, the results may be used as one of the factors that determines a ranking.

The ranking server may be configured to determine one or more rankings. A ranking may be based on various types of network performance data including, for example, the measurement data and other test result data determined based on the one or more measurement device tests performed by the devices 112-115; the one or more metrics determined by the device 118; and the network performance data determined by one or more service providers (e.g., as determined and stored by the server 121). In addition to the network performance data, the ranking may be based on results of one or more surveys generated by the ranking server 106 and completed by one or more users. The factors that form the basis for the ranking may be weighted to adjust the importance of the individual factors (e.g., the network performance data may be assigned a first weight that is greater than a second weight assigned to the results of the one or more surveys). The ranking may be based on one or more types of users. For example, a first ranking may be determined for a consumer and a second ranking may be determined for a business user. The types of network performance data included in a ranking for a consumer may differ from the types of network performance data included in a ranking for a business user. For example, a ranking for a consumer may include network performance data associated with a video data service. A ranking for a business user may include network performance data associated with a voice call service. As another example difference between rankings for consumers and business users, the weights applied to the network performance data may differ between a ranking for a consumer and a ranking for a business user. The rankings may be based on network performance data associated with one or more geographic areas. For example, the ranking may include network performance data associated with a particular city, county or state. Based on the above, various rankings may be determined. For FIG. 1, some example rankings include, for example, a ranking of the performance of video streaming services for wireless network 103 and wireless network 104; a ranking of the performance of video streaming services for wireless network 103 and wireless network 104; a ranking of the performance of wireless network 103 and wireless network 104 in a geographic area; a ranking of the performance of wireless network 103 and wireless network 104 for a consumer; a ranking of the performance of wireless network 103 and wireless network 104 for a business user; and any combination of these examples. A ranking may order the wireless networks from highest performance to lowest performance. These rankings may be distributed to one or more users or other entities (e.g., via email, published on a website, or the like).

The above discussion of FIG. 1 provides a brief introduction to the aspects described herein for determining network performance. Additional details on the above-mentioned aspects, as well as other aspects not mentioned above, will be discussed in connection with the remaining figures. The examples described below may refer to one or more devices of the system depicted in FIG. 1. For example, FIGS. 2A-2E show an example flow performed by the measurement server 105; the ranking server 106; devices 112, 114, 116; the one or more user devices 120; the server 121 of the first service provider; and the server 119 of the second service provider. The measurement server 105 and the ranking server 106 may be separate devices. Alternatively, the measurement server 105 and the ranking server 106 may be configured as part of a single computing device. For simplicity, in FIGS. 2A-2E, features involving the measurement server 105 and the ranking server 106, are performed by measurement and ranking server(s). Further, for clarity, devices 112 and 114 are referred to, respectively, as first measurement device 112 and second measurement device 114. Additionally, while any example ranking discussed in connection with FIGS. 2A-2E may be discussed in terms of the wireless networks 103 and 105, rankings may include more than two wireless networks.

Figure 2A:
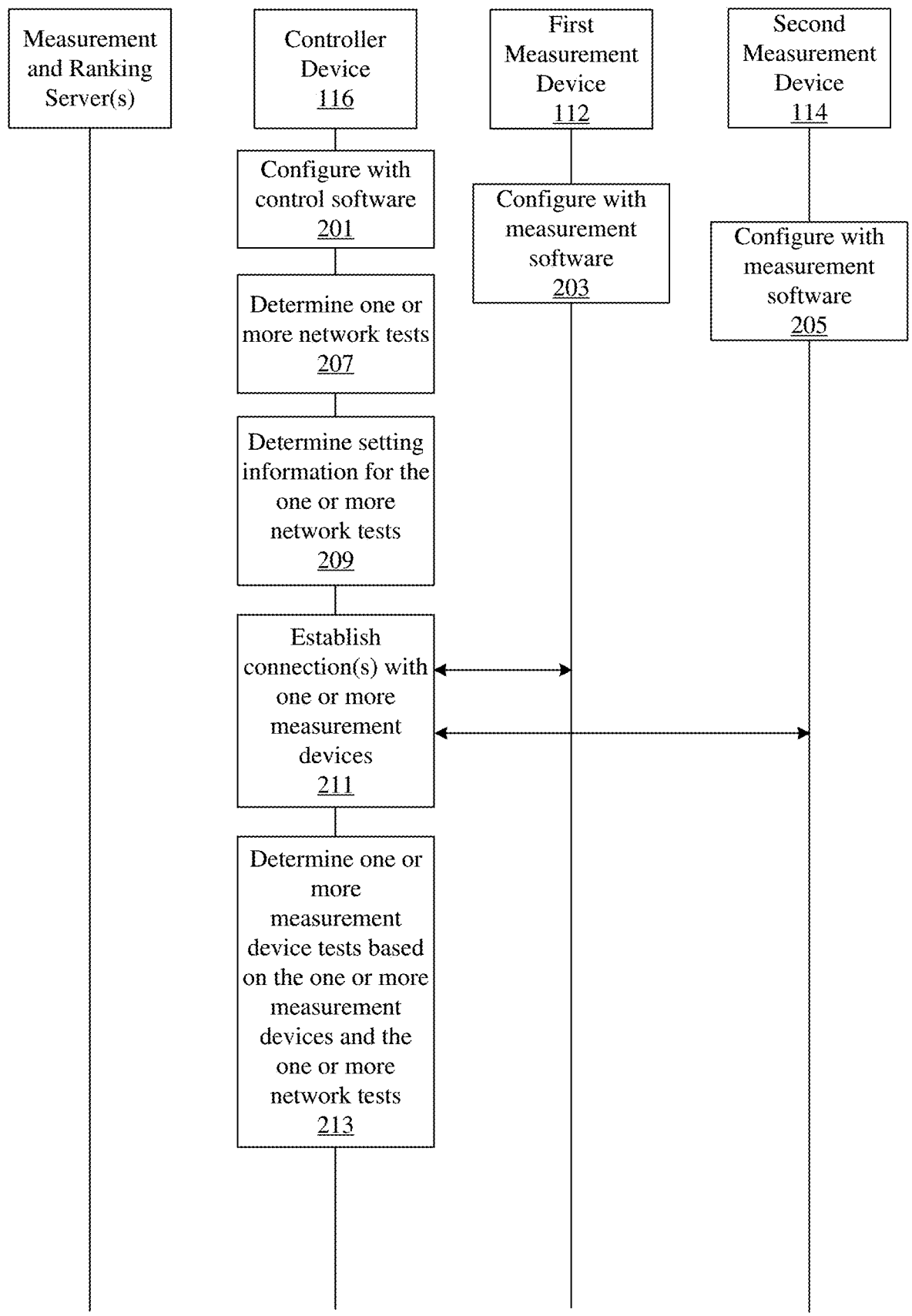
FIGS. 2A-2E show an example flow for determining network performance based on measurement data determined based on one or more network tests, one or more surveys that indicate a preference or level of satisfaction associated with a service, or other network performance data.
Figure 2B:
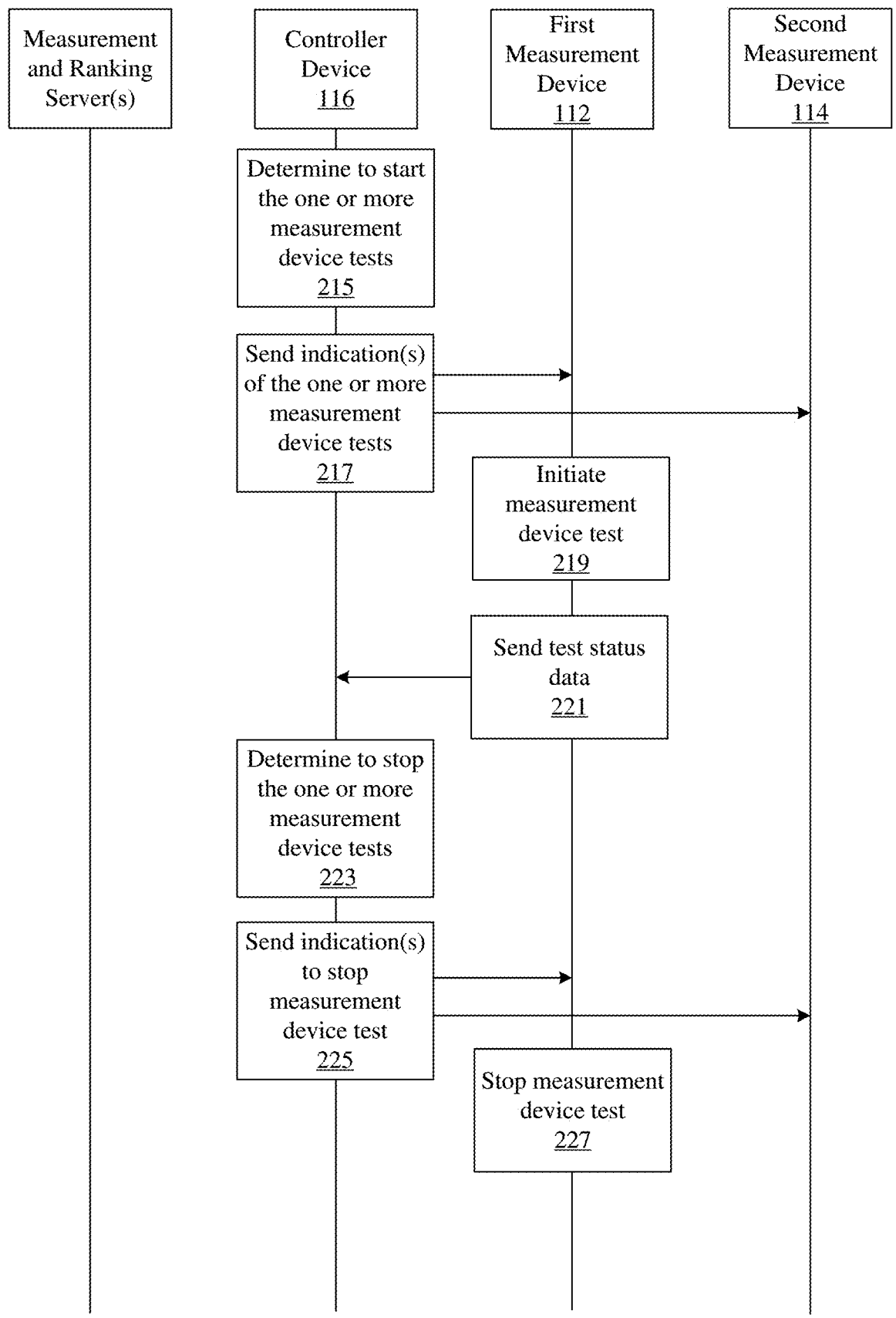
Figure 2C:
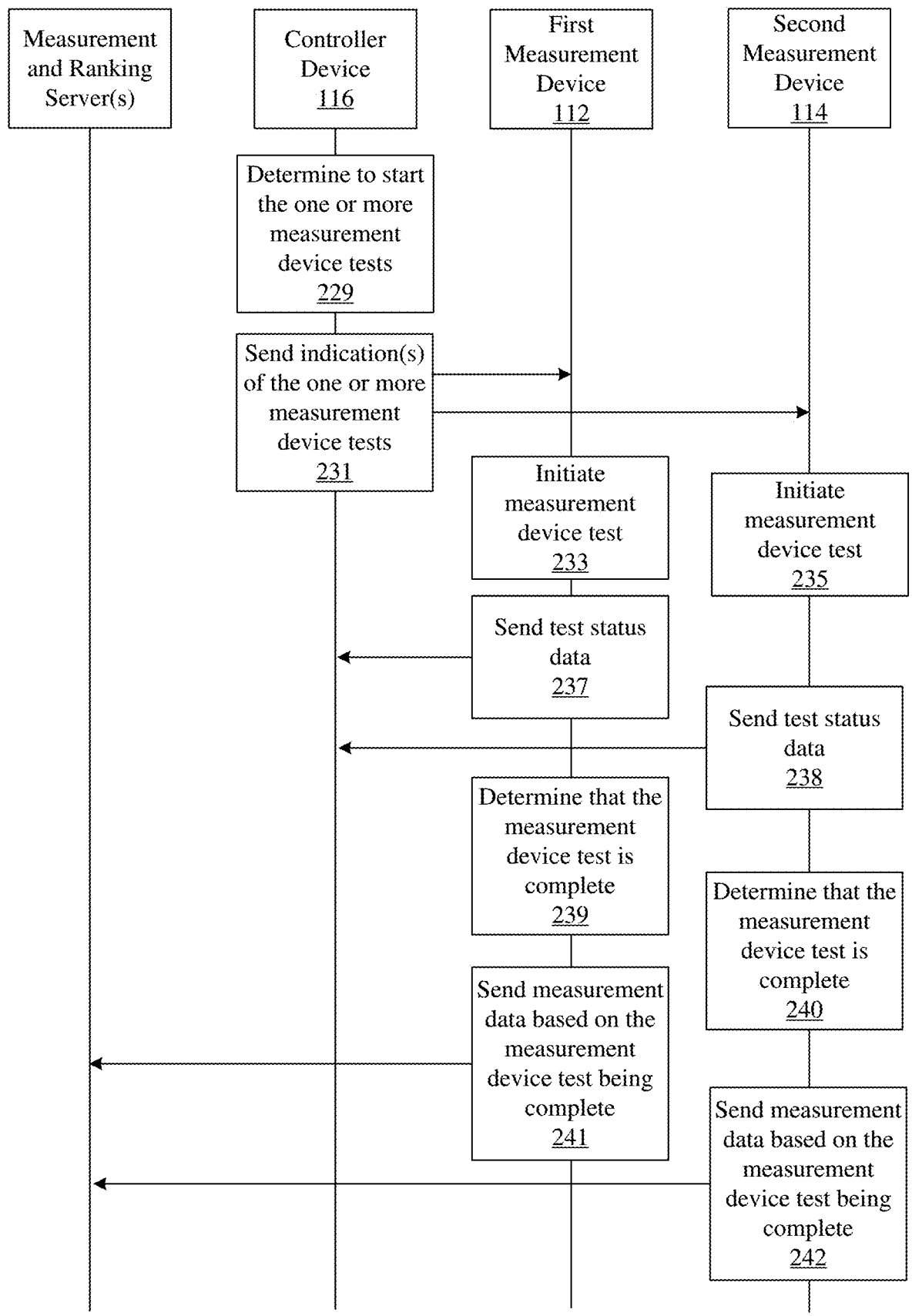
Figure 2D:
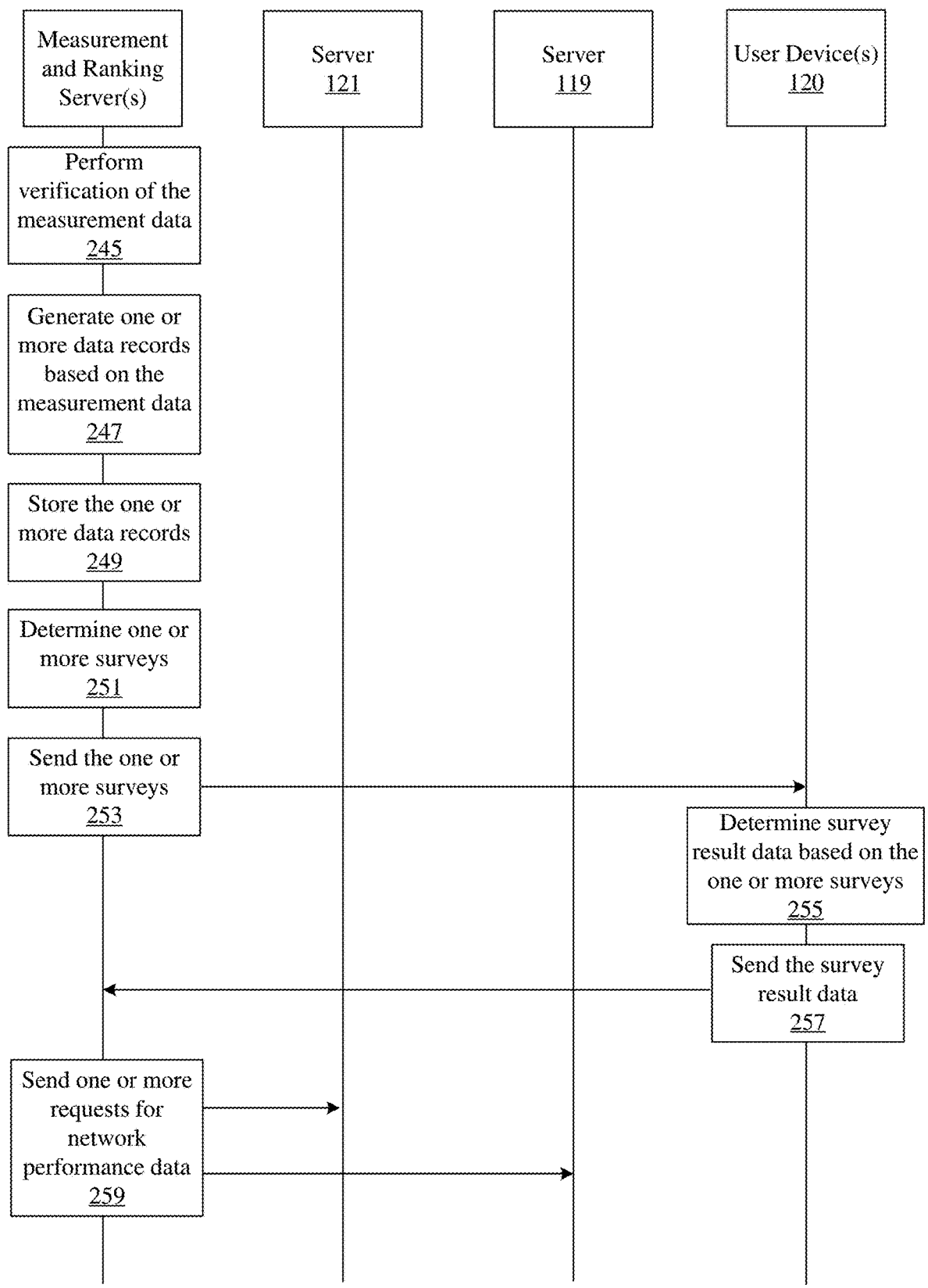
Figure 2E:
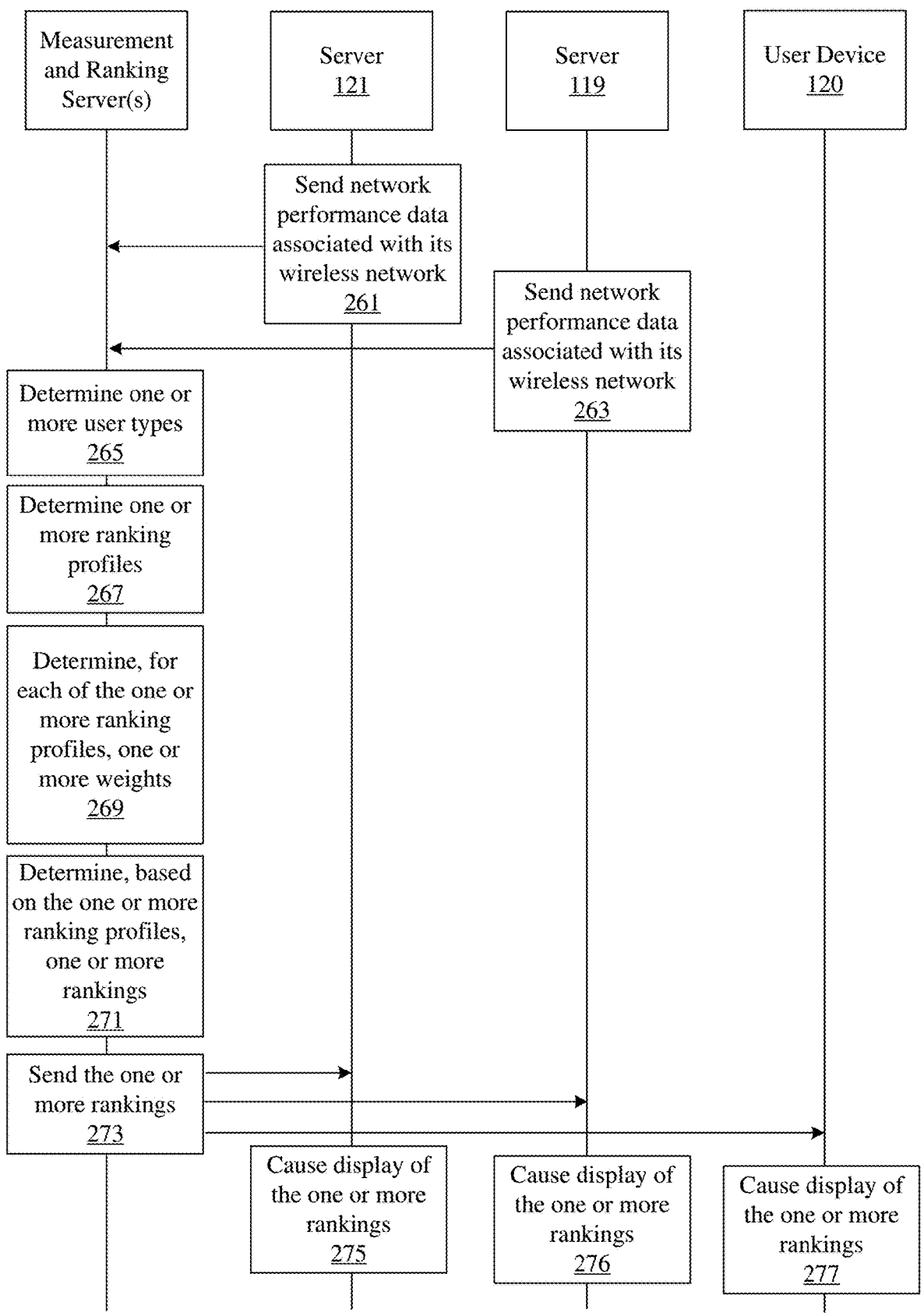

FIGS. 2A-2E show an example flow for determining network performance based on measurement data determined based on one or more measurement device tests, one or more surveys that indicate a preference or level of satisfaction associated with a service, or other network performance data. Items 201-249 of FIGS. 2A-2D are examples associated with determining measurement data and other test result data based on the performance of one or more measurement device tests. Items 251-257 of FIG. 2D are examples associated with determining results based on one or more surveys. Items 259-277 of FIGS. 2D-2E are examples associated with determining one or more rankings of the wireless network 103 and 105 based on the measurement data determined based on the one or more measurement device tests performed in association with items 201-249; the one or more surveys performed in connection with items 251-257; and other network performance data (e.g., network performance data received from server 121, 119, or one or more metrics received from device 118).

Beginning at 201 of FIG. 2A, the controller device 116 may be configured with control software. The control software may be a software application and configuring the controller device 116 with the control software may include installing the software application on the controller device 116. The control software may be configured to, when executed, cause the controller device 116 to generate a user interface that allows user interaction. Based on one or more user interactions with the user interface, the control software may, when executed, cause the controller device to establish connections with one or more measurement devices; determine one or more network tests; determine, based on the one or more network tests, one or more measurement device tests that are to be performed by the one or more measurement devices; and cause the one or more measurement devices to perform the one or more measurement device tests. Examples of the displays that may be generated for the user interface are shown in FIGS. 7A-7G and 8A-8H, and will be discussed in connection with various features of the controller device 116 described in connection with FIGS. 2A-2D. The controller device 116 may receive the control software based on an application store associated with the operating system of the controller device 116.

At 203, the first measurement device 112 may be configured with measurement software. The measurement software may be a software application and configuring the first measurement device 112 with the measurement software may include installing the software application on the first measurement device 112. The measurement software may be configured to, when executed, cause the first measurement device 112 to establish a connection with a controller device; and based on one or more communications from the controller device, perform one or more measurement device tests, send test status data to the controller device, and send measurement data or other test result data to a measurement server. The measurement data or other test result data may be determined based on the one or more measurement device tests. The first measurement device 112 may receive the measurement software based on an application store associated with the operating system of the first measurement device 112.

At 205, the second measurement device 114 may be configured with measurement software. The measurement software may be a software application and configuring the second measurement device 114 with the measurement software may include installing the software application on the second measurement device 114. The measurement software may be configured to, when executed, cause the second measurement device 114 to establish a connection with a controller device; and based on one or more communications from the controller device, perform one or more measurement device tests, send test status data to the controller device, and send measurement data or other test result data to a measurement server. The measurement data or other test result data may be determined based on the one or more measurement device tests. The second measurement device 114 may receive the measurement software based on an application store associated with the operating system of the second measurement device 114.

At 207, the controller device 116 may determine one or more network tests. A network test may, for example, be associated with a service and may, when performed, determine an indication of data speed or reliability. A network test may be defined by a type of network test and one or more configuration settings. Further, the one or more network tests may be in an order that defines which test is performed first, which test(s) are performed next, and which test is performed last. The determination of the one or more network tests may be performed based on user interaction with a user interface.

Figure 7A:
FIGS. 7A-7G show example displays that are associated with determining and initiating performance of one or more network tests.

Display screen 700 of FIG. 7A shows examples of network tests. As depicted by display screen 700, the controller device 116 previously determined eight example network tests. The first example test is a ping test that may determine a round trip time of a ping message to a server, such as the measurement server 105. The second example test is a browser test that may determine a time to request and receive a webpage. The third example test is a Hypertext Transfer Protocol (HTTP) download test that may determine a time to download a volume of data (e.g., 100 megabytes, 200 megabytes of data) or measure of data throughput based on one or more HTTP requests. The one or more HTTP requests may be sent to the measurement server 105, and the one or more HTTP requests may be requesting a video file stored in the database 122. Alternatively, the one or more HTTP requests may be sent to a web server that is configured to respond with the video file. The video file may be sent via one or more HTTP packets. The fourth example test is an HTTP upload test that may determine a time to upload a volume of data (e.g., 100 megabytes of video, 200 megabytes of audio) or a measure of data throughput based on one or more HTTP packets. The one or more HTTP packets may include data formatted as video, and may be sent from a measurement device to the measurement server 105 or to some other web server. The fifth example test is a multithread HTTP download test that may determine a time to complete downloads or a measure of data throughput performed by two or more threads. Each thread may be attempting to download a volume of data, such as video or audio, and may operate similar to the HTTP download test. Each thread may download a respective portion of a video file or audio file. The sixth example test is a multithread HTTP upload test that may determine a time to complete uploads or a measure of data throughput performed by two or more threads. Each thread may be attempting to upload a volume of data, such as video or audio, and may operate similar to the HTTP upload test. Each thread may be attempting to upload a respective portion of a video file or audio file. The seventh test is a voice call or video call service test that may determine a time for a wireless network to process a call and initiate the connection (e.g., indicated by a ringing sound audible at the measurement device). The eighth test is a User Datagram Protocol (UDP) test that may determine a time to upload or download a volume of data, such as video or audio, using one or more UDP packets or a measure of data throughput based on sending or receiving one or more UDP packets. These eight example network tests are shown in order from the first test (e.g., the ping test) to a last test (e.g., the UDP test).

The determination of a network test may be based on user interaction that indicates a type of a network test. For example, to indicate the type of a network test, a user may press on the add test button of display 700. Upon pressing the add test button of display 700, a listing of available types of network tests may be displayed. Arrow 701 indicates a pop-up window 705 that may be generated and the pop-up window 705 shows a listing of available types of network tests. As depicted in FIG. 7A, the pop-up window shows that the available types of network tests include, among others, a ping test, a browser test, a HTTP download test, a HTTP upload test, a multi-thread HTTP download test, a multi-thread HTTP upload test, and a call test. The user may interact with the pop-up window 705 to indicate a selected network test. The selected network test may be added to the display 700.

Figure 7B:
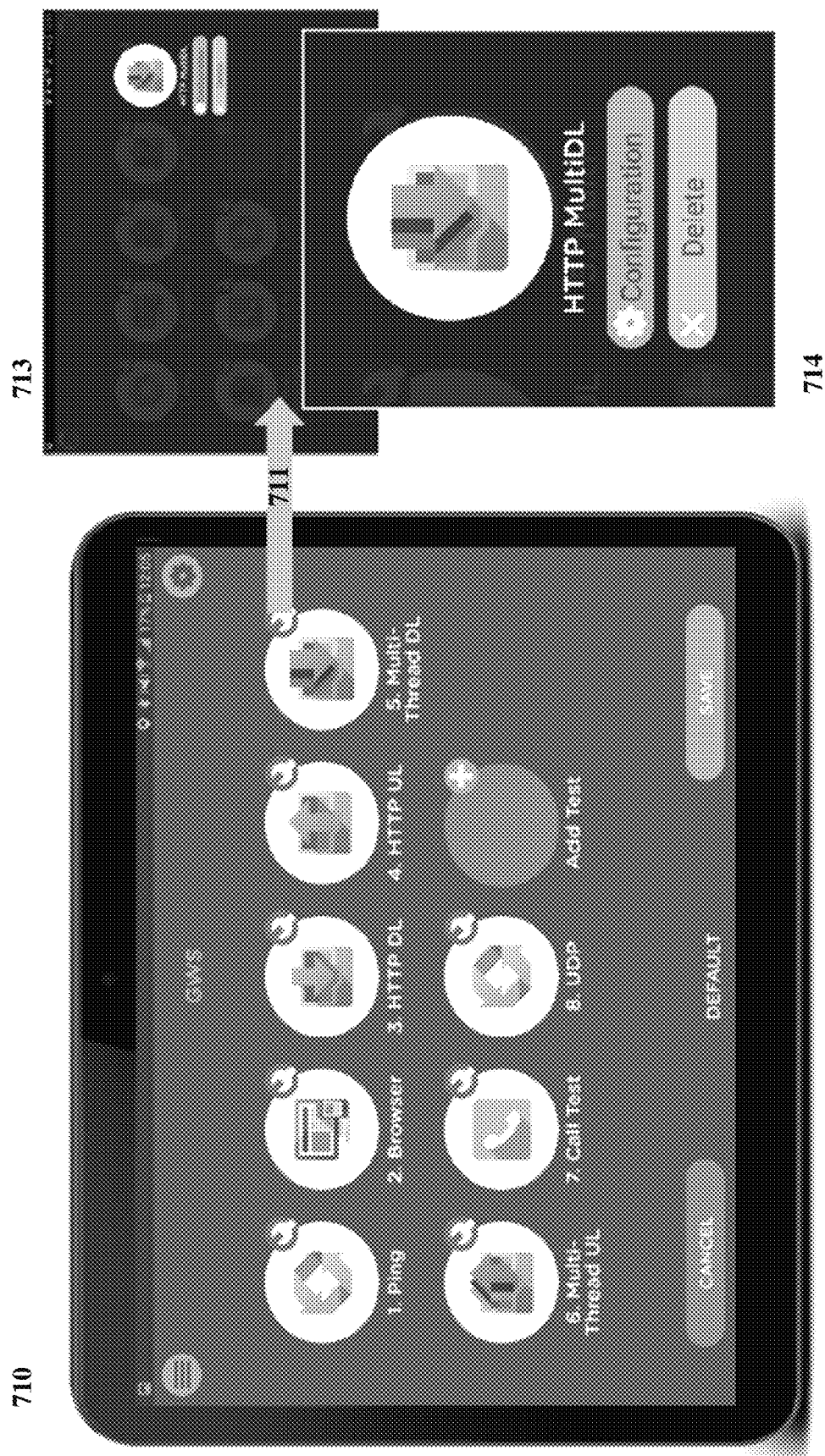
Figure 7C:
Figure 7C:
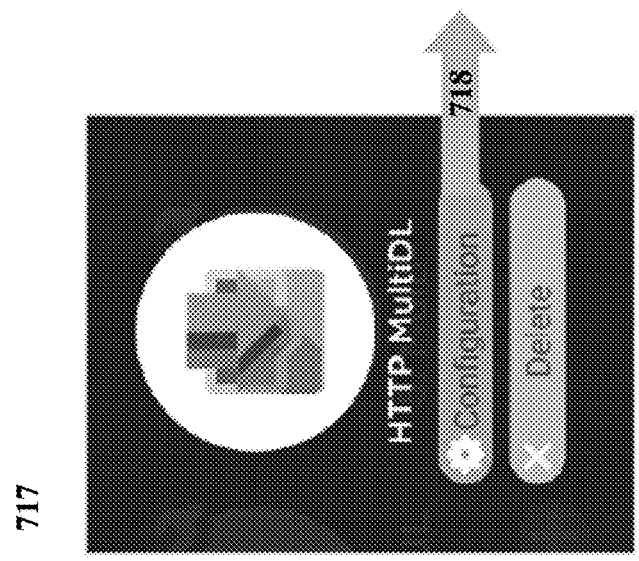

The determination of a network test may be based on user interaction that indicates one or more configuration settings for a network test. For example, to indicate one or more configuration settings, a user may press the edit button associated with a network test. FIG. 7B shows an example display 710 where a user presses on an edit button associated with the multithread HTTP download test. As indicated by arrow 711, based on the user's press of the edit button, a pop-up window 713 may be displayed. The pop-up window 713 includes an option to delete the multithread HTTP download test or to edit the configuration of the multithread HTTP download test. Based on the pop-up window 713, the user may press over the edit configuration button of the multithread HTTP download test. Based on the user's press, a display screen for inputting one or more configuration settings may be displayed. An example display that may be generated for inputting one or more configuration settings is shown by FIG. 7C. As depicted by FIG. 7C and as indicated by arrow 718, the user may press on edit configuration button and, based on that press, example display 720 may be displayed. Example display 720 includes interface controls that enable the user to input or otherwise indicate one or more configuration settings for the multithread HTTP download test. Each type of network test may have its own set of configuration settings (e.g., a ping test may have configuration settings different from the multithread HTTP download test). As depicted by the example display 720, the user may be able to input a Universal Resource Locator (URL) for the data file that is to be downloaded; an amount of data that is to be downloaded (e.g., File Size with a user being able to select 100 megabytes, 150 megabytes, 250 megabytes, or 500 megabytes); a maximum time for initiating the download (e.g., MaxSetupTime with a user being able to select a maximum number of seconds); a maximum duration for downloading the data file (e.g., MaxDurationTime with the user being able to select a maximum number of seconds); and an indication of the number of threads to execute (e.g., Thread Count with a user being able to select the number of threads). The user may be able to interact with the interface controls to select values for the one or more configuration settings and, when complete, may press the save button to store the selected values for the one or more configuration settings.

At 209, the controller device 116 may determine setting information for the one or more network tests. The setting information may include, for example, an indication of cycles for the one or more network tests; an indication of one or more servers that will receive the measurement data or other test result data (e.g., a URL for the measurement server 105 or a URL for the measurement and ranking server(s)); an indication of a network type associated with the one or more network tests (e.g., an indication of 3G, 4G, or 5G); and/or an indication of one or more other properties (e.g., an identifier associated with the one or more network tests).

Figure 7D:

The determination of the setting information may be based on user interaction that indicates, for the one or more network tests, the setting information. FIG. 7A provides an example of the one or more network tests and FIG. 7D provides an example that allows a user to input or otherwise indicate a portion of the setting information for the one or more network tests of FIG. 7A. Further, FIG. 7D is associated with an indication of cycles. The indication of cycles may indicate how many instances the one or more network tests should be repeated. For example, with respect to the example display 700 of FIG. 7A, an indication of cycles may indicate how many times the eight example network tests should be repeated. As depicted in FIG. 7D, example display 730 includes interface controls that allow a user to indicate a number of cycles (e.g., Count with a user being able to select the number of cycles); indicate a duration for each cycle (e.g., Duration with a user being able to indicate whether the cycles should be limited to a duration and to indicate a duration, in seconds, for each cycle); and/or indicate that the one or more network tests should be performed continuously (e.g., continuous with a user being able to indicate whether the cycles should be performed continuously). The user may be able to interact with the interface controls to select values for the indication of cycles and, when complete, may press the save button to store the selected values for the indication of cycles. The user may perform a similar process of interacting with user interface controls to input or otherwise indicate other portions of the setting information for the one or more network tests.

For the remaining portions of the example flow of FIGS. 2A-2E, an example set of one or more network tests will be discussed. The example set may include tests similar to those depicted in the example display 700 (e.g., the eight example network tests of example display 700). This example set of one or more network tests will be identified by an identifier ("BulgariaScript") associated with the eight example network tests of the example display 700, which is first shown at example display 750 of FIG. 7F.

At 211, the controller device 116 may establish one or more connections with one or more measurement devices. As depicted in FIG. 2A, the controller device 116 may establish a connection with the first measurement device 112 and the second measurement device 114. The connection to the first measurement device 112 may be a BLUETOOTH connection or a ZIGBEE connection. Similarly, the connection to the second measurement device 114 may be a BLUETOOTH connection or a ZIGBEE connection. Establishing the one or more connections may be based on user interaction that indicates the one or more measurement devices. For example, the controller device 116 may generate a user interface that indicates measurement devices that can be connected to by the controller device (e.g., which measurement devices are available for pairing via a BLUETOOTH connection). The user may interact with the user interface to select or otherwise indicate one or more measurement devices from those that are available (e.g, the user may select the first measurement device 112 and the second measurement device 114 for pairing via a BLUETOOTH connection). Based on the indication of the one or more measurement devices, the controller device 116 may initiate a process for establishing a connection to each of the one or more measurement devices. Upon establishing the connections, the controller device 116 may generate a user interface that indicates, to the user, that connections are established to the first measurement device 112 and the second measurement device 114.

At 213, the controller device may determine, based on the one or more measurement devices and the one or more network tests, one or more measurement device tests. The one or more measurement devices tests may be assigned or otherwise associated with the first measurement device 112 or the second measurement device 114. Further, the one or more measurement device tests may indicate which of the one or more network tests are to be performed by the first measurement device 112 or the second measurement device 114. Accordingly, each measurement device test may be defined based on a type of network test for each of the one or more network tests, one or more configuration settings for each of the one or more network tests, and setting information for the one or more network tests. In this way, the user may be able to select which of the one or more network tests are to be performed by the first measurement device 112 and the second measurement device 114.

Figure 7E:
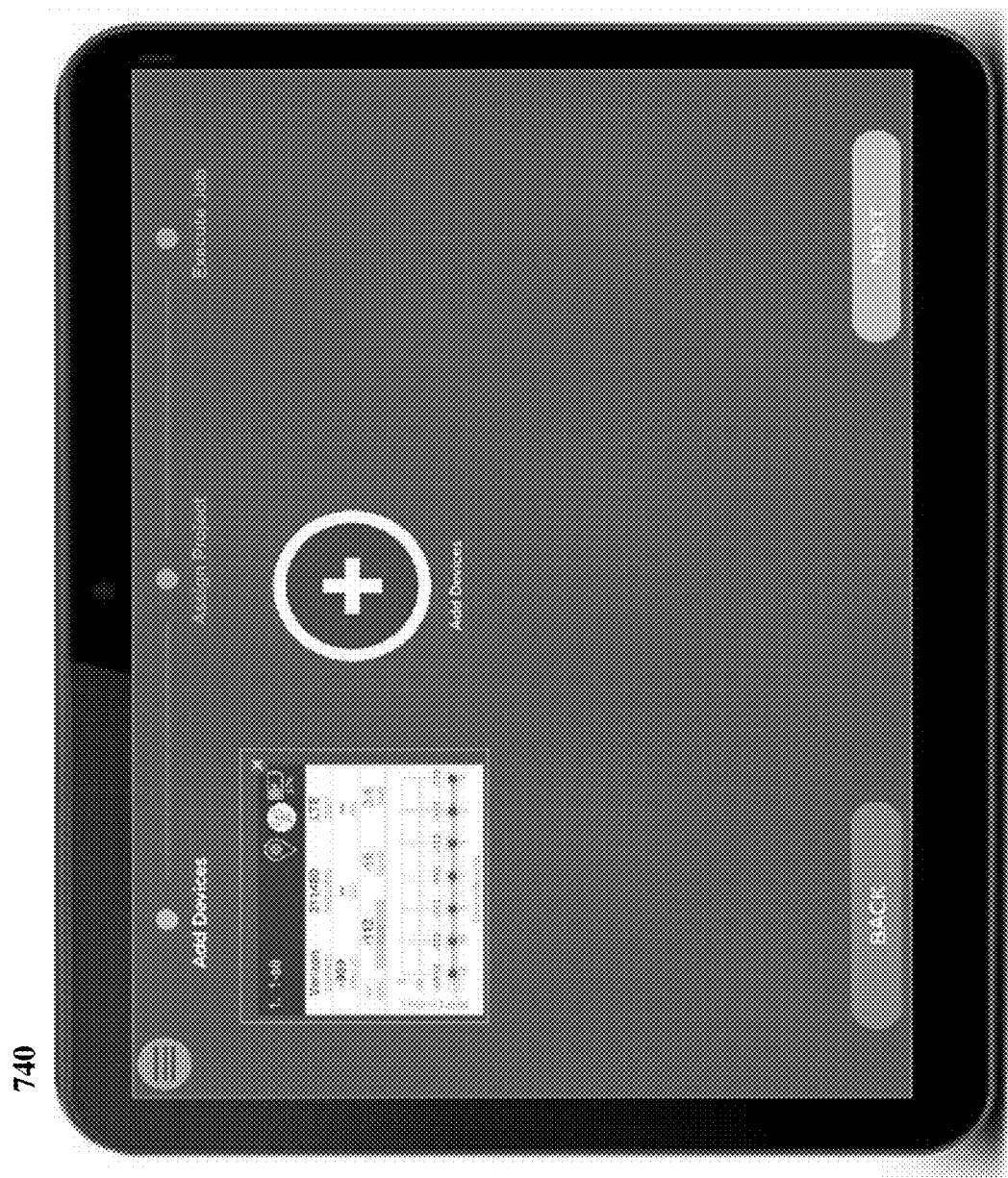
Figure 7F:
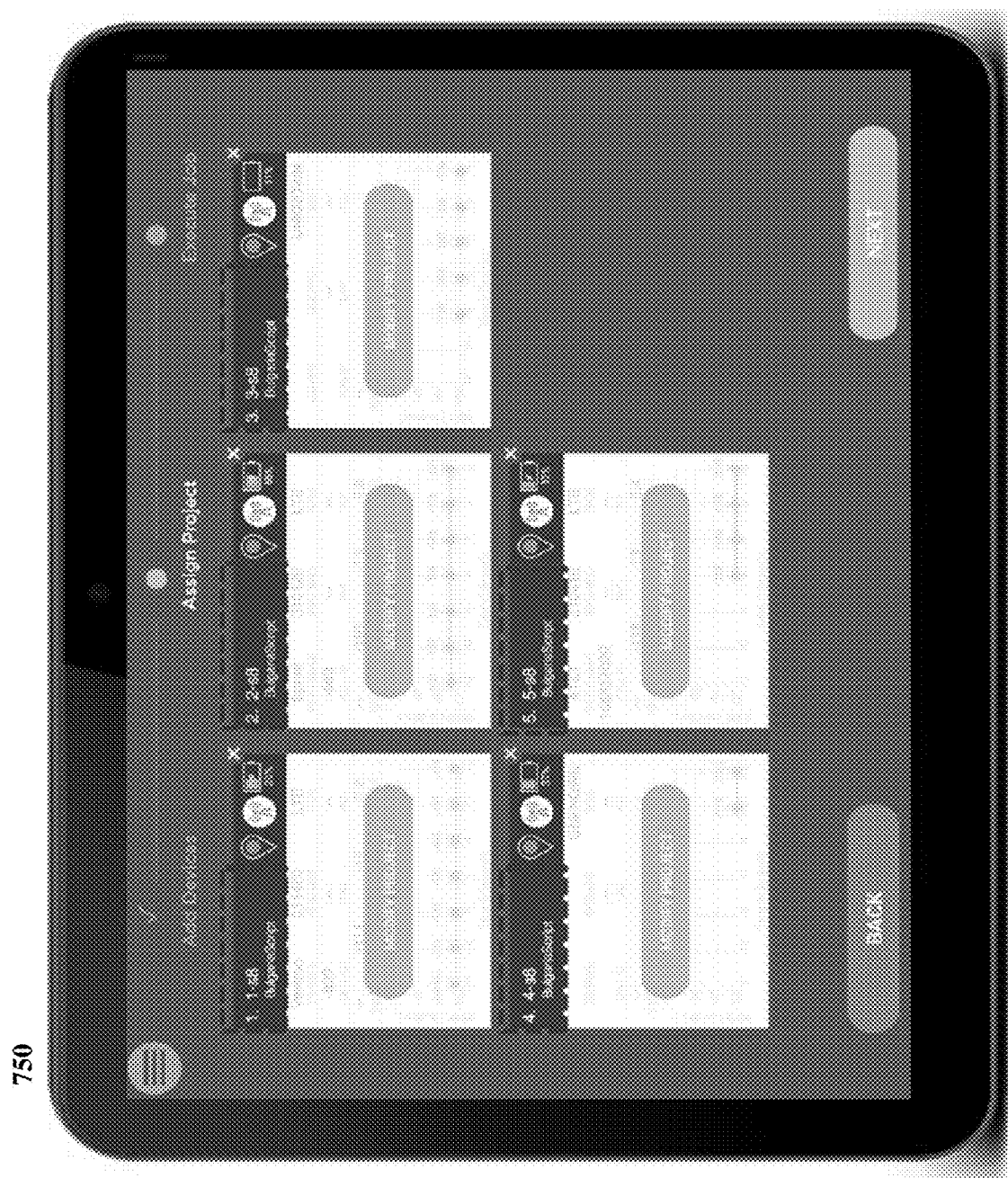
Figure 7G:
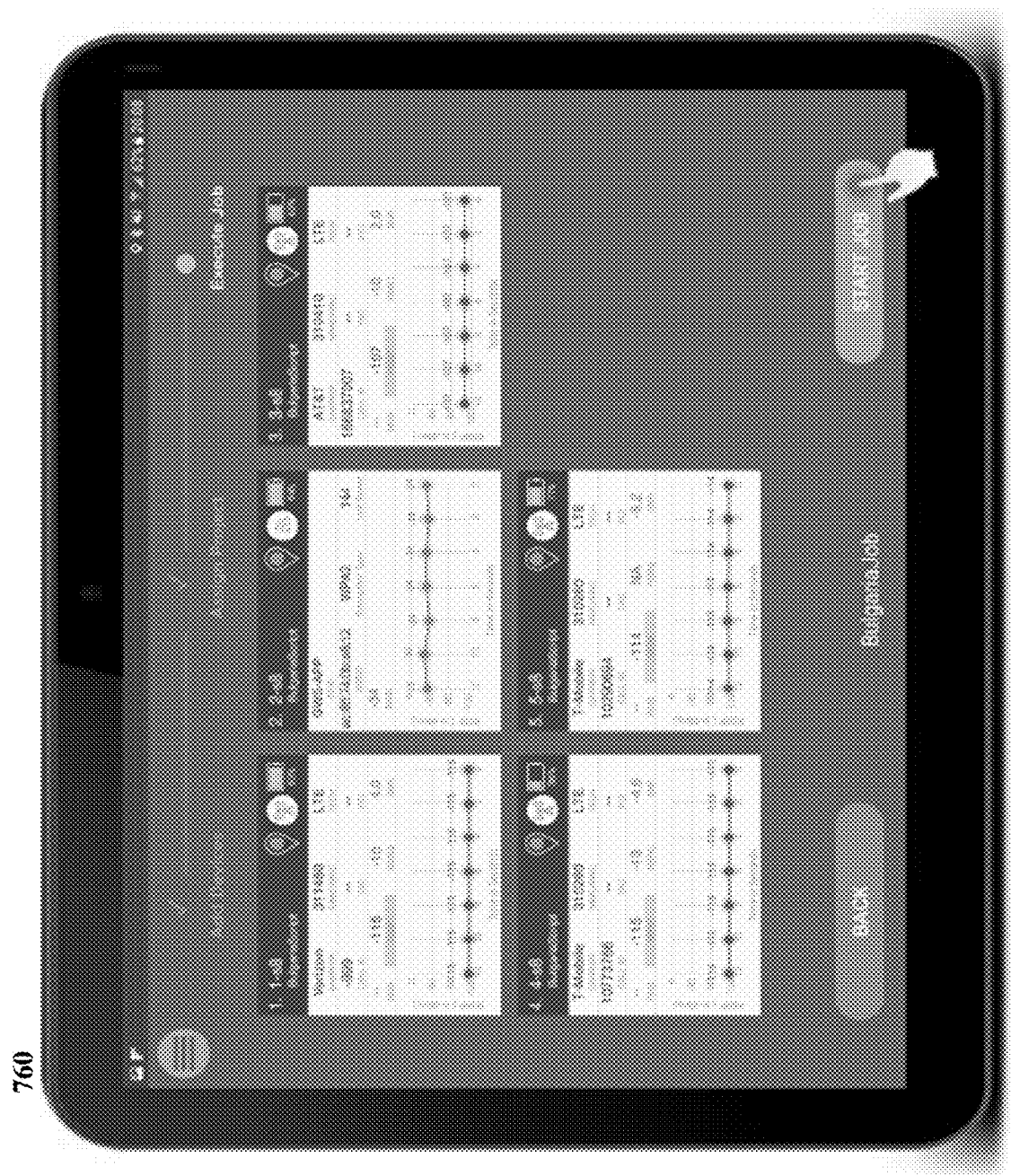

This determination may be performed based on user interaction that indicates which of the one or more network tests are to be performed by the one or more measurement devices. FIGS. 7E-7G show example displays that allow a user to indicate which of the one or more network tests are to be performed by the one or more measurement devices. Further, FIGS. 7E-7G show example displays that allow a user to indicate which of the one or more measurement devices (e.g., those with established connections) are to perform at least one measurement device test, and indicate which of the one or more network tests are to be assigned as a measurement device test. Example display 740 of FIG. 7E shows an example where a user has indicated that one measurement device (e.g., the first measurement device 112) is to perform at least one measurement device test. A second measurement device (e.g., the second measurement device 114) could be added based on the user pressing the add devices button, which would allow the user to select from any remaining measurement device with established connections. As depicted in example display 740, each measurement device is shown with status information that indicates identifying information and wireless signal properties associated with the measurement device. For example, the status information may include a service provider identifier (e.g., Verizon, AT&T, T-Mobile); a technology identifier (e.g., Long Term Evolution (LTE), 3G, 4G, 5G); a cellular identifier (e.g., –999, as shown in example display 740); a signal-to-noise ratio, SNR (e.g., 3.4, as shown in example display 740, or other value of SNR); a reference signal received quality, RSRQ (e.g., –10, as shown in example display 740, or other value of RSRQ); and one or more values of reference signal received power, RSRP (e.g., the plot of time and RSRP in dBm). The display of the status information may indicate that the connection to the measurement device is established and the controller device 116 is able to communicate with the measurement device.

Upon successfully adding the one or more measurement devices based on user interaction with, for example, example display 740, the user may press the "NEXT" button to proceed to indicate which of the one or more network tests are to be performed by the one or more measurement devices. The user may indicate which of the one or more network tests are to be performed by the one or more measurement devices based on user interaction with a user interface. For example, for each of the one or more measurement devices, the user may be able to press a button to assign or otherwise associate one or more network tests with the measurement device. Based on the user pressing the button to assign or otherwise associate, the controller device 116 may generate a pop-up window that lists identifiers associated with the one or more network tests. The listing may include an identifier for any set of one or more network tests that has been saved by the controller device 116. Items 207-209 of FIG. 2A described one example set that may be saved to the controller device 116 (e.g., a set including tests similar to the eight network tests of example display 700, and associated with the identifier "BulgariaScript"). Accordingly, the listing may include the identifier ("BulgariaScript") associated with the example set discussed in connection with items 207-209 of FIG. 2A. Based on the list displayed by the pop-up window, the user may select one of the identifiers to assign or associate the selected set to the measurement device. For example, by selecting the identifier ("BulgariaScript") associated with the example set discussed in connection with items 207-209 of FIG. 2A, the user may assign or associate the example set to the first measurement device 112 or the second measurement device 114. The user may repeat this process until each of the one or more measurement devices is assigned or associated with a set of one or more network tests. In this way, a measurement device test (e.g., the assigned or associated set of one or more network tests) may be determined for each of the one or more measurement devices.

Example display 750 provides an example where a user has completed assigning or associating a set of one or more network tests to the one or more measurement devices. Further, the example display 750 provides an example where a user has assigned or associated with example set discussed in connection with items 207-209 of FIG. 2A ("BulgariaScript") with each of the shown five measurement devices. For example, each of the measurement devices shown by the example display 750 includes an indication of "BulgariaScript" to indicate the assignment or association. Accordingly, each of the measurement devices may, when performing its measurement device test, perform tests similar to the example eight network tests shown in example display 700 of FIG. 2A. In other words, the first measurement device 112 may, when performing its measurement device test, perform the example eight network tests of the example display 700. The second measurement device 114 may, when performing its measurement device test, perform the example eight network tests of the example display 700.

Based on the example display 750, the user may be able to modify the assignment or association if desired. To complete the assignment or association process, the user may press the "NEXT" button of the example display 750. Upon pressing the "NEXT" button, the controller device 116 may generate a display, similar to example display 760 of FIG. 7G, that indicates the status of each measurement device, indications of the one or more measurement device tests (e.g., as shown by FIG. 7G, "BulgariaScript" is the identifier for each the measurement device test), and a button that allows the user to begin the one or more measurement device tests ("START JOB" as shown by FIG. 7G).

At 215, the controller device 116 may determine to start the one or more measurement device tests. This determination may be performed based on a user pressing a button to start the one or more measurement device tests (e.g., by pressing the button "START JOB" as shown by example display 760 of FIG. 7G).

At 217, the controller device 116 may send an indication of the one or more measurement device tests. The sending may be performed based on the user's press of a button to start the one or more measurement device tests. Further, the sending may be performed to cause the first measurement device 112 and the second measurement device 114 to perform the one or more measurement device tests based on a common window (e.g., devices 112 and 114 may begin the tests at the same or similar time, may perform the tests in parallel or synchronously, and may complete the tests at the same or similar time). As shown in FIG. 2B, each measurement device receives an indication of its measurement device test. The indication of a measurement device test may include information necessary to perform the measurement device test. In general, the indication may include a type for each network test that is to be performed; one or more configuration settings for each network test that is to be performed; and setting information associated with the one or more network tests that are to be performed. For example, the indication of a measurement device test sent to the first measurement device 112 may include information necessary to perform the example eight network tests of the example display 700. Accordingly, the information may include, for each of the eight network tests, a type of the network test and one or more configuration settings (e.g., as determined in connection with item 207 of FIG. 7A). Further, the information may include setting information associated with the eight network tests (e.g., as determined in connection with item 209 of FIG. 7A). The indication of a measurement device test sent to the second measurement device 114 may include similar information as the indication sent to the first measurement device 112.

Items 219-227 of FIG. 2B show an example where a measurement device test is not performing correctly. Further, the measurement device test for the second measurement device 114 is not being performed. The measurement device test for the first measurement device 112 is being performed. This example indicates how the controller device is able to control measurement device tests when the one or more measurement device tests are unable to be performed based on a common window. Beginning at 219, based on receiving the indication of the measurement device test, the first measurement device 112 may initiate a measurement device test. Initiating the measurement device test may include beginning a process that performs a set of one or more network tests, as defined by the measurement device test. Further, because the set of one or more network tests may be in an order, initiating the measurement device test may include starting the first network test in the order. In an example where the measurement device test includes the eight example network tests shown by display 700 of FIG. 7A, initiating the measurement device test may include beginning the ping test. As each network test completes, the first measurement device 112 may proceed to the next network test in the order until the last network test is performed (e.g., the UDP test) or until the controller device 116 indicates that the measurement device test is to be stopped.

At 221, based on the initiation of the measurement device test, the first measurement device 112 may send test status data to the controller device 116. The test status data may include measurement data determined based on performance of the first measurement device's measurement device test (e.g., measurement data determined based on the ping test, measurement data determined based on the HTTP download test, and the like), and other status information associated with the first measurement device 112. Based on the test status data, the controller device 116 may display an indication of the status of the first measurement device 112 and/or a status of the measurement device test being performed by the first measurement device 112. Some examples of the displays that may be generated by the controller device 116 are shown by FIGS. 8A-8D.

As indicated by the example shown by FIG. 2B, the measurement device test is not initiated or performed by the second measurement device 114. This may have been based on the second measurement device 114 not receiving the indication of the measurement device test, or based on the second measurement device 114 not being able to perform a network test (e.g., the ping test cannot be performed). One way in which the second measurement device 114 may not be able to perform the network test is if connectivity with the wireless network is lost. Based on non-performance of the measurement device test, test status data may not be sent by the second measurement device 114. Thus, when the controller device 116 is displaying the status of the second measurement device 114, the user can visibly determine that the measurement device test is not being performed.

At 223, the controller device 116 may determine to stop the one or more measurement device tests. This determination may be based on user interaction with a user interface of the controller device 116. For example, the user may, based on the non-performance of the measurement device test by the second measurement device 114, press a button that indicates to stop a measurement device test. Example displays 800, 810, 820, and 830 of FIGS. 8A-8D show buttons ("STOP") that can be pressed to stop all measurement device tests of the one or more measurement devices. Further example display 870 of FIG. 8H shows an example of a button ("STOP ALL") that can be pressed to stop all measurement device tests of the one or more measurement devices, and buttons that can be pressed to individually stop a measurement device test of a particular measurement device (e.g., the five "STOP" buttons associated with the five measurement devices). In this example, the user may press the button "STOP" on the display 800 of FIG. 8A.

At 225, the controller device 116 may send one or more indications to stop a measurement device test. This sending may be based on the user interaction discussed in connection with item 223. For example, if the user pressed a button to stop a particular measurement device test (e.g., the button "STOP" for the top left measurement device, as shown in the example display 870 of FIG. 8H), the controller device 116 may send an indication to stop the measurement device test to the particular measurement device. If the user pressed a button to stop all measurement device tests, the controller device 116 may send an indication to each measurement device. As shown in FIG. 2B, the controller device 116, based on the user pressing the button "STOP" on the display 800 of FIG. 8A, may send an indication to stop the measurement device test to both the first measurement device 112 and the second measurement device 114.

At 227, the first measurement device may stop the measurement device test. Stopping the measurement device test may be performed responsive to receiving the indication to stop the measurement device test. Stopping the measurement device test may include ceasing to perform a network test currently in progress, stopping any remaining network tests from being performed, and stopping any remaining cycles from being performed. As the second measurement device 114 did not initiate or perform the measurement device test, FIG. 2B does not show the second measurement device 114 as stopping a measurement device test.

Items 229-242 of FIG. 2C show an example where measurement device tests are performing correctly by both the first measurement device 112 and the second measurement device 114. This example indicates how the controller device displays the status of the measurement device tests and how the measurement devices process the measurement data that is generated based on the measurement device tests. Beginning at 229, the controller device 116 may determine to start the one or more measurement device tests. This may be performed similar to the determination discussed in connection with item 215 of FIG. 2B. At 231, the controller device 116 may send one or more indications of the one or more measurement device tests. This may be performed similar to the sending discussed in connection with item 217 of FIG. 2B. As shown in FIG. 2C, the controller device 216 may send an indication of the first measurement device's measurement device test to the first measurement device 112, and may send an indication of the second measurement device's measurement device test to the second measurement device 114. The sending may be performed to the first measurement device 112 and the second measurement device 114 perform the measurement device tests within a common window.

At 233, the first measurement device 112 may initiate the measurement device test. This may be performed similar to the initiation discussed in connection with item 219 of FIG. 2B. By initiating its measurement device test, the first measurement device 112 may proceed with performing one or more network tests in order from a first network test to a last network test. At 235, the second measurement device 114 may initiate the measurement device test. This may be performed similar to the initiation discussed in connection with item 219 of FIG. 2B. By initiating its measurement device test, the second measurement device 114 may proceed with performing one or more network tests in order from a first network test to a last network test.

As its measurement device test is performed, the first measurement device 112 may send test status data. FIG. 2C shows the first measurement device 112 sending test status data at item 237. This sending may be performed similar to the sending of test status data discussed in connection with item 221 of FIG. 2B. Further, the test status data sent by the first measurement device may include measurement data determined based on performance of the first measurement device's measurement device test (e.g., measurement data determined based on the ping test, measurement data determined based on the HTTP download test, and the like), and other status information associated with the first measurement device 112. Similarly, as its measurement device test is performed, the second measurement device 114 may send test status data. FIG. 2C shows the second measurement device 114 sending test status data at item 239. This sending may be performed similar to the sending of test status data discussed in connection with item 221 of FIG. 2B. Further, the test status data sent by the second measurement device may include measurement data determined based on performance of the second measurement device's measurement device test (e.g., measurement data determined based on the ping test, measurement data determined based on the HTTP download test, and the like), and other status information associated with the second measurement device 114.

Based on the test status data sent by the first measurement device 112 and the second measurement device 114, the controller device 116 may display an indication of the status of the first measurement device 112, an indication of a status of the measurement device test being performed by the first measurement device 112, an indication of the status of the second measurement device 114, and/or an indication of a status of the measurement device test being performed by the second measurement device 114. Some examples of the displays that may be generated by the controller device 116 are shown by FIGS. 8A-8D.

Figure 8A:
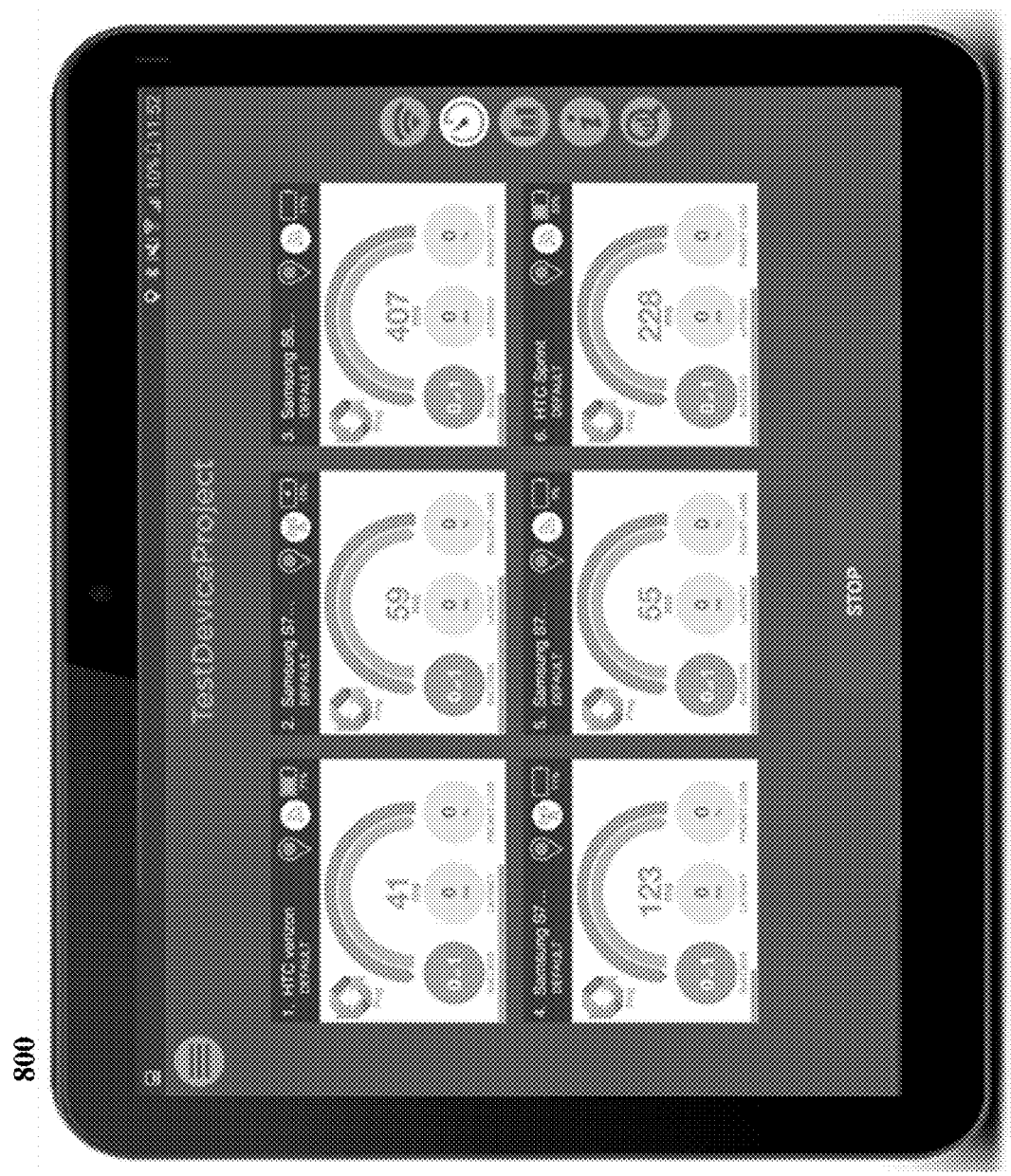
FIGS. 8A-8H show example displays that are associated with monitoring one or more network tests as the one or more network tests are performed.

The example display 800 of FIG. 8A shows a status of a network test that is currently being performed by the one or more measurement devices. As shown by the example display 800, each measurement device is shown as performing a ping test. Each ping test is shown as being incomplete (e.g., as shown by the "SUCCESS" indication). Each ping test is shown with a current latency (e.g., as shown by the "LATENCY" indication). Each ping test is shown with a current packet loss (e.g., as shown by the "PACKET LOSS" indication). Each ping test is shown with a current round-trip-time (as shown by the milliseconds indication). What types of status information that would be included in the display may depend on the type of network test being currently performed. In other words, what is displayed for the ping test might differ from what is displayed for an HTTP upload test. Some examples of status information for other network tests are shown in the example display 830 of FIG. 8D.

Figure 8B:
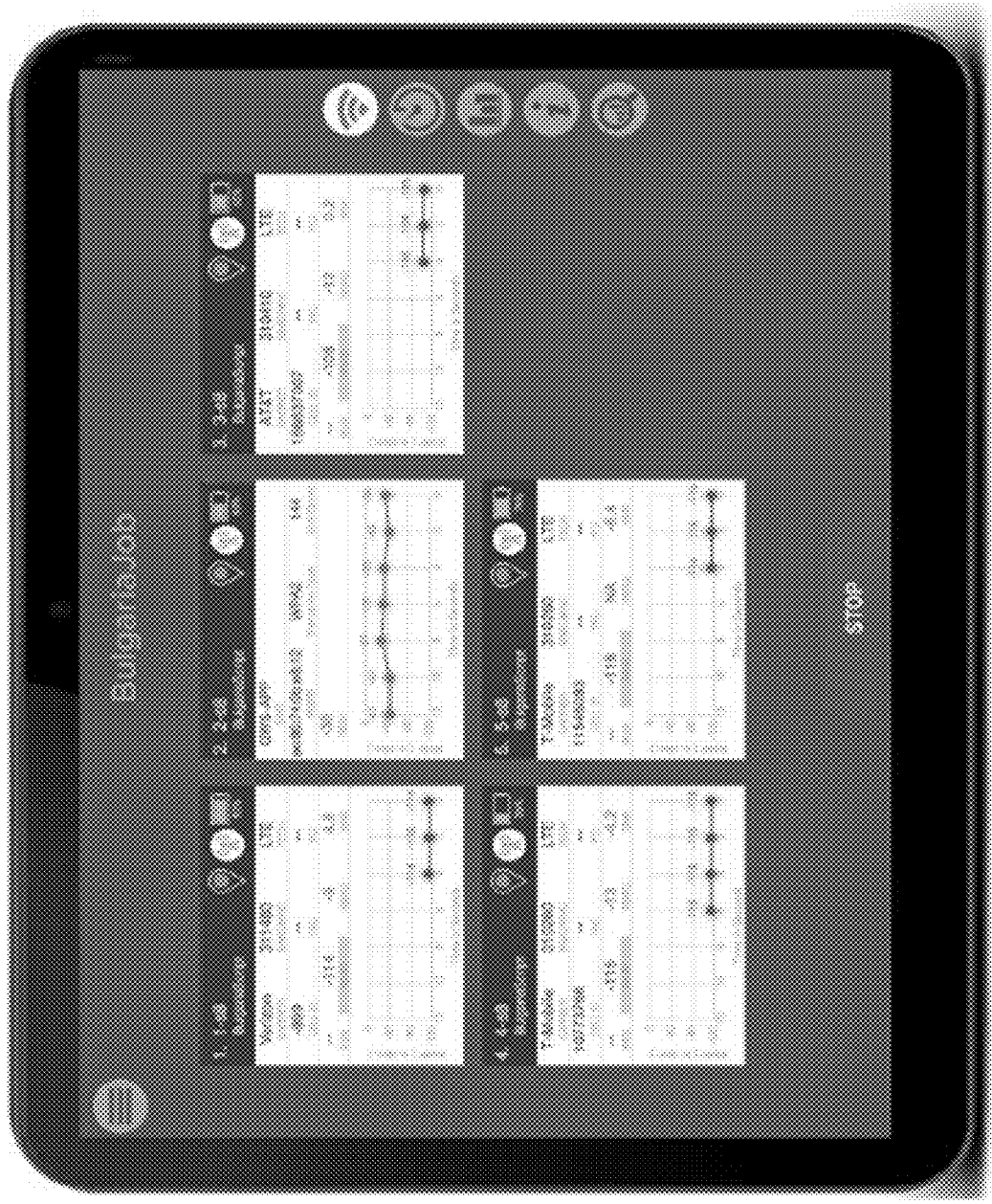

The example display 810 of FIG. 8B shows a status of the one or more measurement devices. As shown by the example display 810, various properties of the one or more measurement devices is shown as well as some signal properties of the one or more measurement devices. The types of status information shown for the example display 810 may be similar to the information discussed in connection with the example display 760 of FIG. 7G.

Figure 8C:
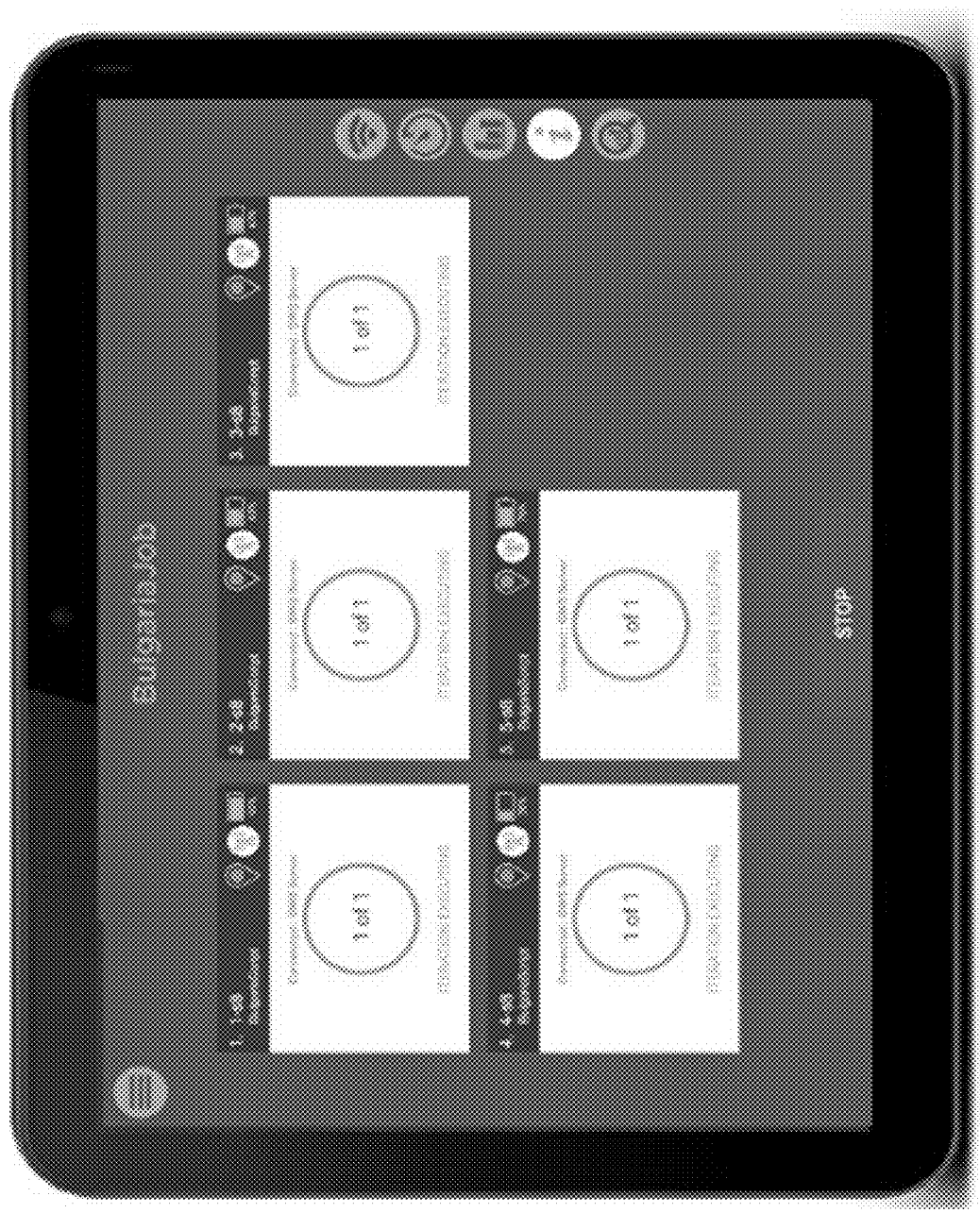

The example display 820 of FIG. 8C shows a status of the one or more cycles associated with the measurement device test. As shown by the example display 820, the cycle being currently performed is shown for each measurement device. Further, the example display 820 shows that each measurement device test is performing a single cycle of one or more network tests.

Figure 8D:
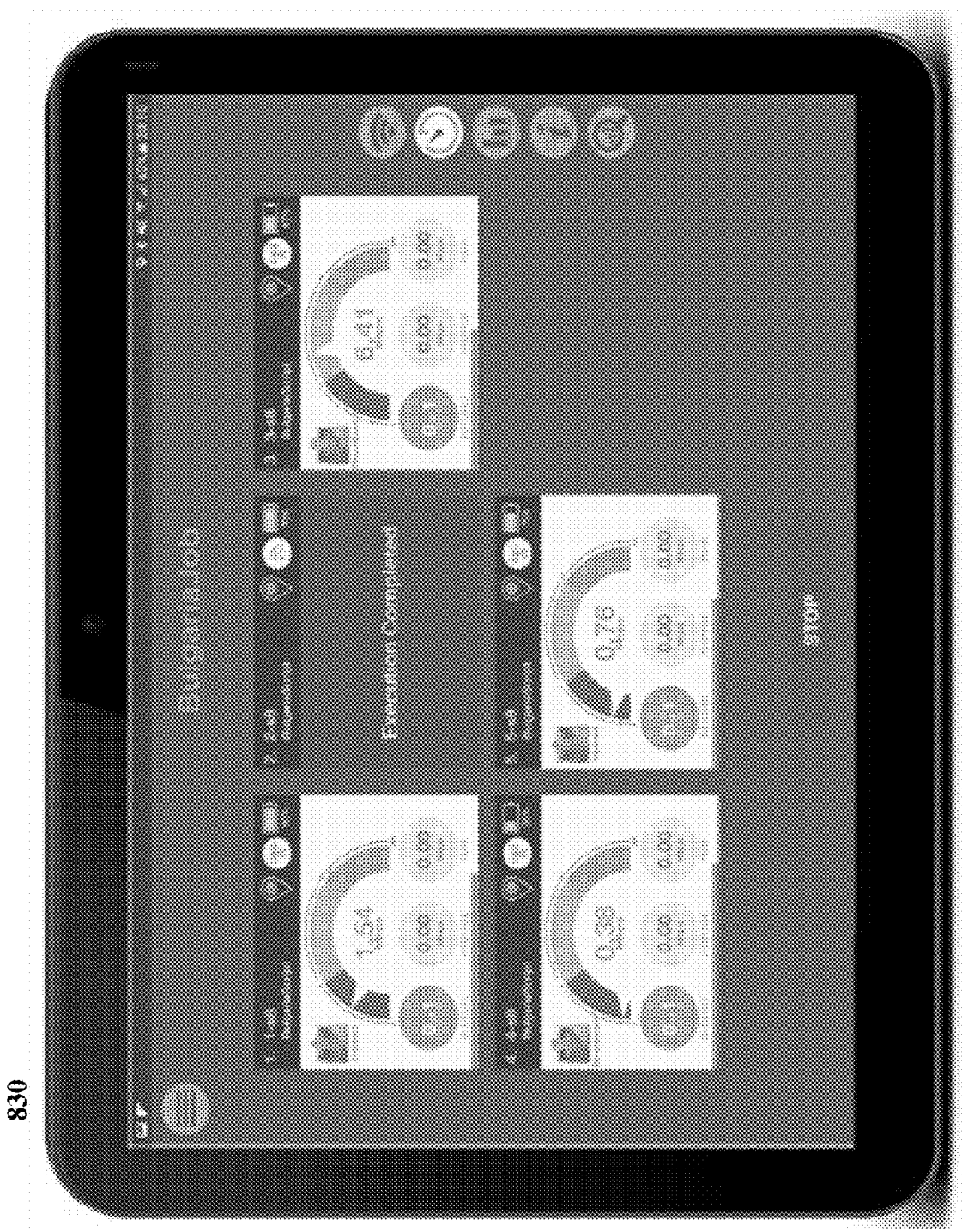

The example display 830 of FIG. 8D shows another example similar to the example display 800 of FIG. 8A. As shown by the example display 830 and as compared to the example display 800, some of the measurement device tests have proceeded to different network tests (e.g., none of the measurement devices are indicated as performing the ping test any longer). Further, one of the measurement devices has finished executing the measurement device test (e.g., the final network test completed and there are no more cycles left to perform).

Each measurement device may proceed to perform its measurement device test by performing one or more network tests in order. Test status data may be repeatedly sent to the controller device 116 as each measurement device proceeds to perform its measurement device test. As each network test completes, each measurement device may determine that the measurement device test is complete. For example, a measurement device test may be complete based on completion of each network test in a cycle and based on there being no more cycles left to perform. Further, if a measurement device test includes the eight network tests shown by the example display 700 of FIG. 7A and only one cycle is to be performed, the measurement device may determine that its measurement device test is complete when the eight test tests have been completed and based on there not being a second cycle to perform. FIG. 2C shows the first measurement device 112 determining that its measurement device test is complete at 239. FIG. 2C shows the second measurement device 114 determining that its measurement device test is complete at 240.

At 241, the first measurement device 112 may, based on its measurement device test being complete, send measurement data. The measurement data may be sent to the measurement or ranking server(s). The measurement data may have been determined based on performance of the first measurement device's measurement device test. In other words, the measurement data may include one or more measurements, one or more metrics, or other data that was determined by performing each network test of the first measurement device's measurement device test. For example, if eight network tests were performed (e.g., the eight network tests as shown by the example display 700 of FIG. 7A), the measurement data may include one or more measurements, one or more metrics, or other data for each of the eight network tests.

At 242, the second measurement device 114 may, based on its measurement device test being complete, send measurement data. The measurement data may be sent to the measurement or ranking server(s) (e.g., measurement server 105). The measurement data may have been determined based on performance of the second measurement device's measurement device test. In other words, the measurement data may include one or more measurements, one or more metrics, or other data that was determined by performing each network test of the second measurement device's measurement device test. For example, if eight network tests were performed (e.g., the eight network tests as shown by the example display 700 of FIG. 7A), the measurement data may include one or more measurements, one or more metrics, or other data for each of the eight network tests.

As some examples of the one or more measurements, one or more metrics, or other data that may be included in the measurement data, a ping test may determine a round trip time of a ping message to a server. A browser test may determine a time to request and receive a webpage. An HTTP download test may determine a time to download a volume of data (e.g., 100 megabytes, 200 megabytes of data) or a measure of data throughput based on one or more HTTP requests. The HTTP download test may be associated with a particular service (e.g., a video data service, an audio data service, and the like) and, therefore, may download data of the appropriate type (e.g., video, audio, and the like). An HTTP download test may determine a time to upload a volume of data (e.g., 100 megabytes of video, 200 megabytes of audio) or a measure of data throughput based on one or more HTTP packets. The HTTP upload test may be associated with a particular service (e.g., a video data service, an audio data service, and the like) and, therefore, may upload data of the appropriate type (e.g., video, audio, and the like). A multithread HTTP download test may determine a time to complete downloads or a measure of data throughput performed by two or more threads. Each thread may be attempting to download a volume of data, such as video or audio, and may operate similar to the HTTP download test. A multithread HTTP upload test may determine a time to complete uploads or a measure of data throughput performed by two or more threads. Each thread may be attempting to upload a volume of data, such as video or audio, and may operate similar to the HTTP upload test. A voice call or video call service test that may determine a time for a wireless network to process a call and initiate the connection (e.g., indicated by a ringing sound audible at the measurement device). A similar metric could be determined based on a video streaming service test. For example, a video streaming service test may determine a time between a request for a video stream and the display of the first frame of the video stream. A UDP test may determine a time to upload or download a volume of data, such as video or audio, using one or more UDP packets or a measure of data throughput based on sending or receiving one or more UDP packets. Further, each metric determined based on a network test may be a maximum or minimum determined based on the network test (e.g., a maximum round-trip time; a maximum download speed; or a minimum upload speed). Each metric determined based on a network test may be an average or mean (e.g., an average round-trip time as determined based on round-trip times for multiple ping messages; an average download speed as determined based on multiple upload tests). Further, for each network test, the measurement data may include a success rate of the test. For example, if any packets were lost or download/upload tasks failed to complete, the measurement data may indicate the success rate by a count of the failures (e.g., 2 packets were lost by a ping test) or a percentage of failure (e.g., 0% packets were lost by a ping test). As yet another example, the measurement data may indicate any error conditions generated by the network tests including, for example, HTTP error codes. Examples of HTTP error codes can be found in Internet Engineering Task Force (IETF) Request for Comments (RFC) 2616 and IETF RFC 7231. These example tests may determine additional or alternative measurements or metrics. Further, a measurement device may perform additional or alternative network tests not listed in these examples.

In addition to the measurement data, each measurement device may send other test result data to the measurement and ranking server(s). The other test result data sent by the first measurement device 112 may include, for example, an indication of the first measurement device's operating system, an indication of a geographic area where its measurement device test was performed, and/or an indication of the service provider associated with the wireless network that the first measurement device 112 was communicating with (e.g., an indication of the first service provider). The other test result data sent by the first measurement device 112 may include, for example, an indication of which network tests were performed by the first measurement device 112. The indication of which network tests were performed by the first measurement device 112 may include similar information as the indication of the measurement device test as discussed in connection with item 217 of FIG. 2B. The other test result data sent by the second measurement device 114 may include, for example, an indication of the second measurement device's operating system, an indication of a geographic area where its measurement device test was performed, and/or an indication of the service provider associated with the wireless network that the second measurement device 112 was communicating with (e.g., an indication of the first service provider). The other test result data sent by the second measurement device 114 may include, for example, an indication of which network tests were performed by the second measurement device 114. The indication of which network tests were performed by the second measurement device 114 may include similar information as the indication of the measurement device test as discussed in connection with item 217 of FIG. 2B.

Figure 8E:
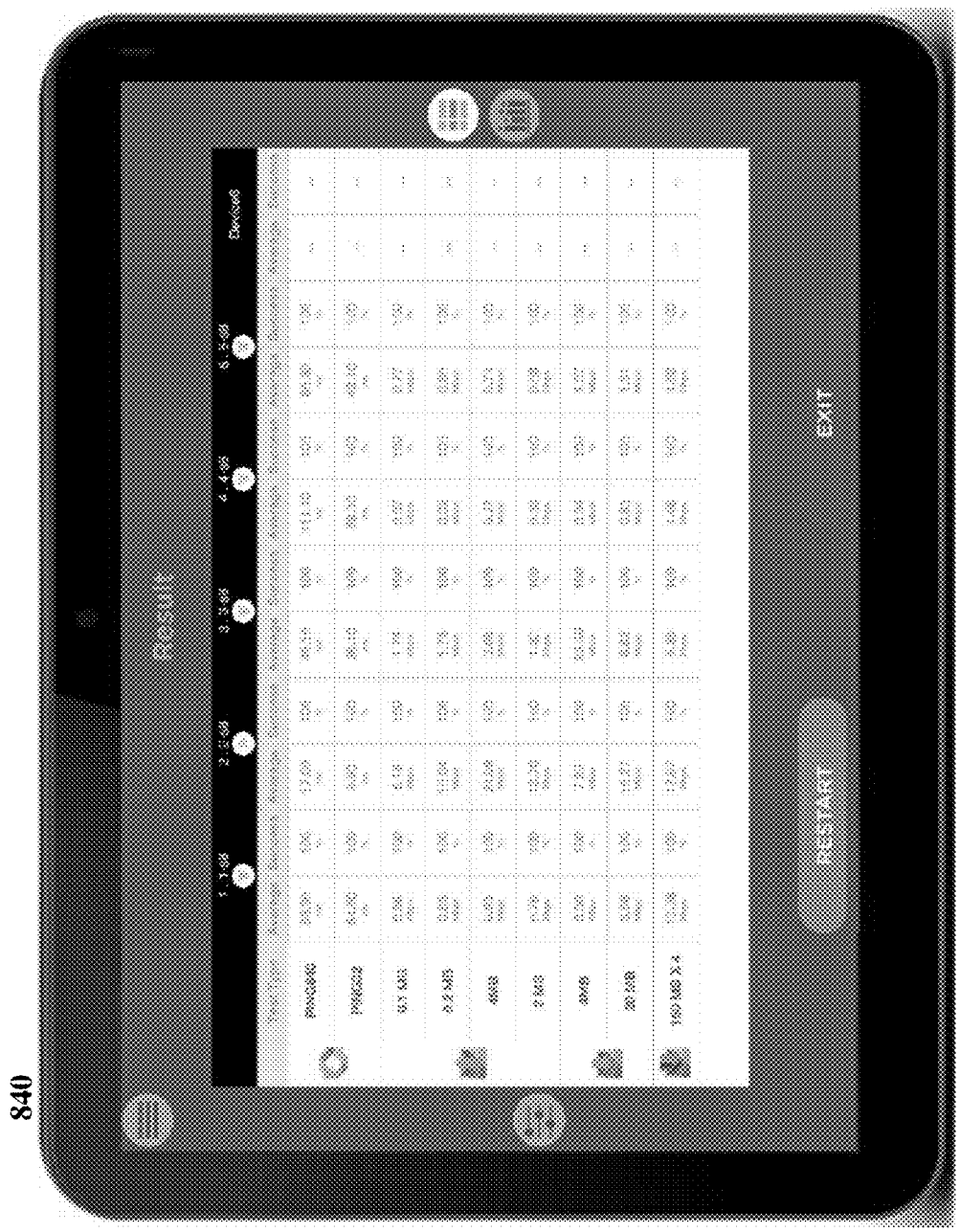
Figure 8F:
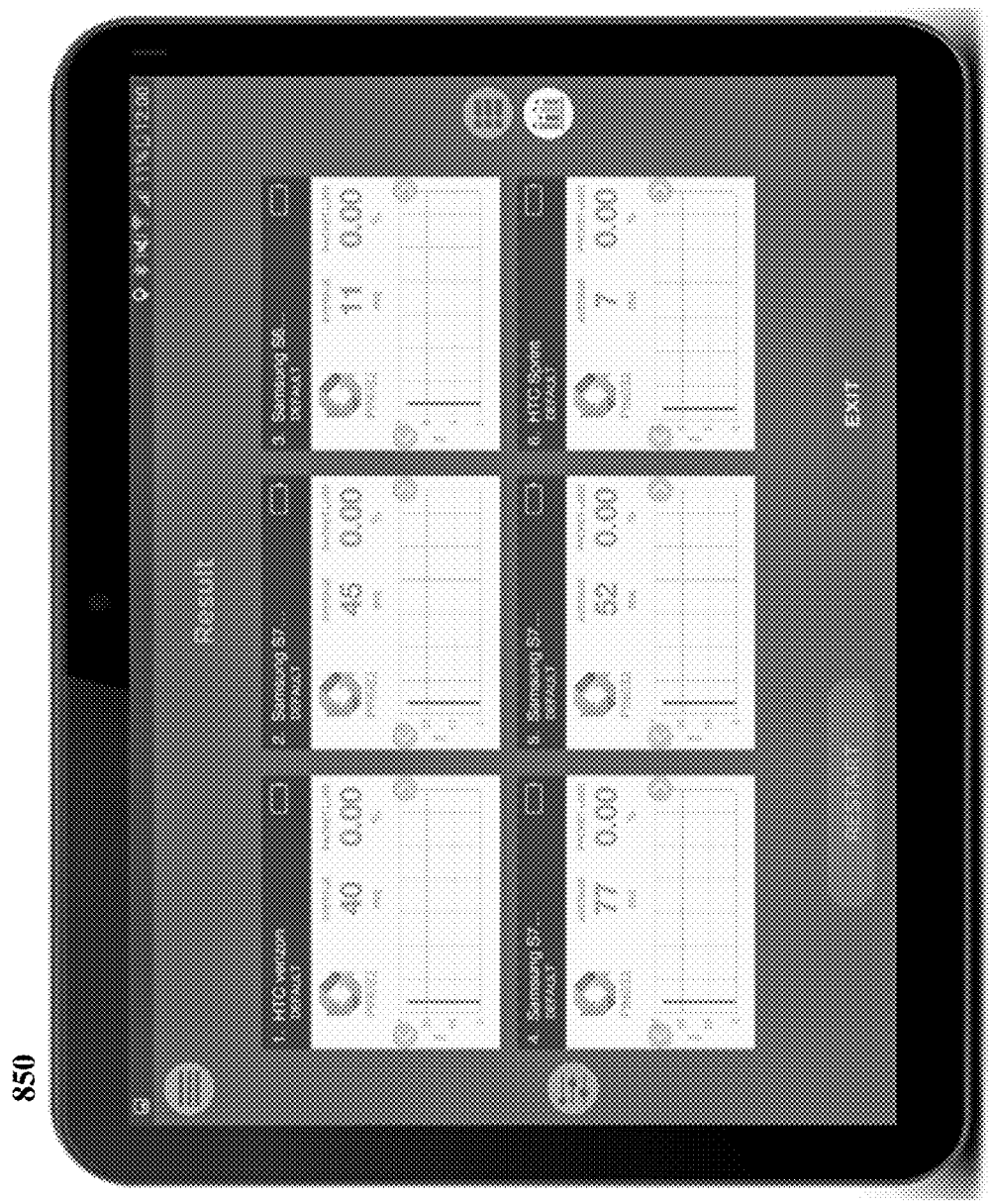
Figure 8G:
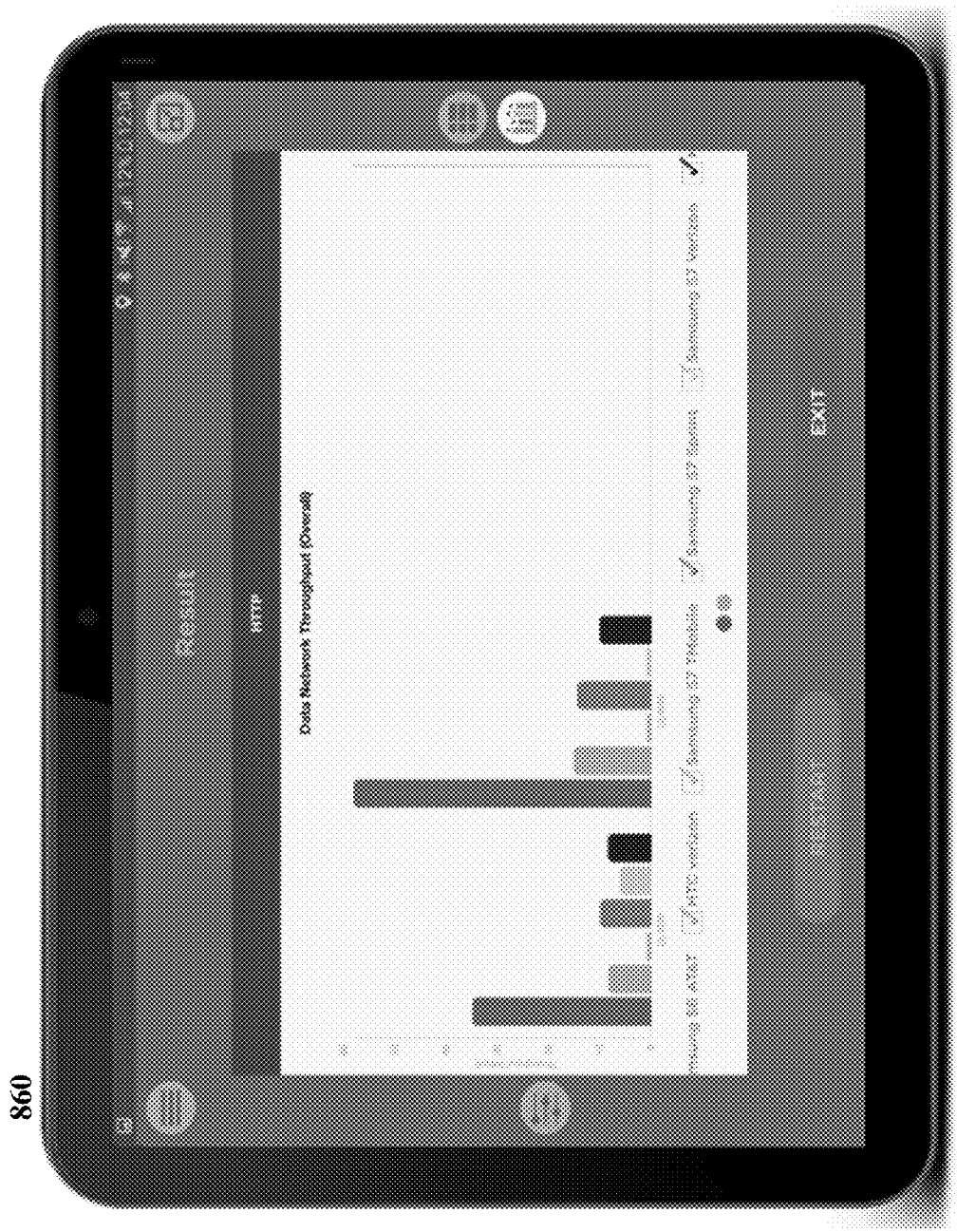
Figure 8H:
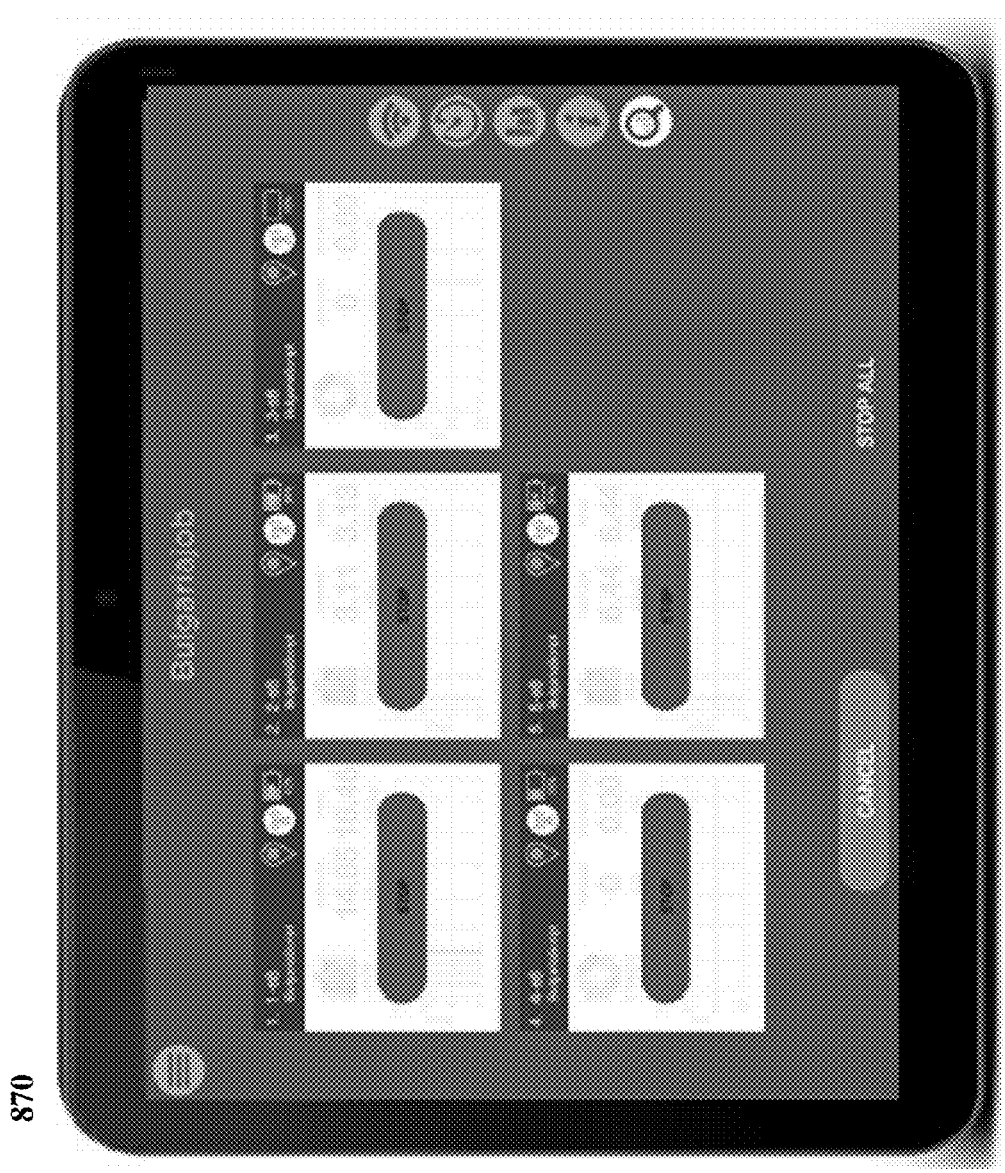

After the measurement device tests are complete and/or during the measurement device tests, the controller device 116 may generate displays that provide a summary of the measurement device tests. In this way, a user may be able to view measurement data determined based on the measurement device tests. The summary may be based on measurement data that was received by the controller device 116 as part of the test status data. Further, each measurement device may send measurement data to the controller device 116 after completion of its measurement device test (not shown in FIG. 2C). The measurement data FIGS. 8E-8G show example displays that provide a summary of the measurement device tests. Further, each example display of FIGS. 8E-8G include a button that allows for the measurement device tests to be restarted (e.g., each example display of FIGS. 8E-8G includes a "RESTART" button).

The example display 840 of FIG. 8E shows an example that provides measurement data in a tabular form. Each network test has one or more rows of measurement data, and each measurement device has one or more columns of measurement data. For example, as shown in the example display 840, the measurement device identified as "1-s8" is shown as having an average upload speed of 0.93 megabits per second for 4 megabytes of data.

The example display 850 of FIG. 8F shows an example that provides measurement data in graphical form for each measurement device. Measurement data for a single network test is shown for each measurement device. For example, as shown in the example display 850, the measurement device identified as "HTC Verizon" is shown as having an average ping round trip time of 40 milliseconds and a packet loss rate of 0.0%. A user may view measurement data for other tests by pressing the arrow buttons associated with each measurement device.

The example display 860 of FIG. 8G shows an example that provides measurement data in graphical form for comparing the measurement devices. Measurement data for one or more network tests is shown and organized together. For example, as shown in the example display 860, the graph shows results for an HTTP upload test and an HTTP download test. For each test, measurement data from five measurement devices is organized and shown via bar graphs.

At 245, the measurement and ranking server(s) may perform a verification of the measurement data received from one or more measurement devices. The verification may be performed on the measurement data received from the first measurement device 112, and the verification may be performed on the measurement data received from the second measurement device 114. The verification may be performed, for example, to identify and remove any inaccurate or unreliable data from the measurement data. The measurement data received from the first measurement device 112 may be compared to the measurement data received from the second measurement device 114. The measurement data may be compared to determine inconsistency between network tests. For example, if the ping tests performed by the first measurement device 112 and the second measurement device 114 determined round trip times that differed from each other by more than a threshold amount (e.g., 100 milliseconds), the verification may determine that the measurement data associated with the ping tests are inconsistent. The verification may remove inconsistent data from the measurement data (e.g., the inconsistent round trip times may be removed from the measurement data).

The above example of verification causes data to be removed from the measurement data based on a determination of inconsistency. Additionally or alternatively, the verification may cause data to be included based on a determination of consistency. For example, the measurement data received from the first measurement device 112 may be compared to the measurement data received from the second measurement device 114. If the comparison determines the measurement data are within a threshold of each other, the measurement data may be verified. As a particular example, if the ping tests performed by the first measurement device 112 and the second measurement device 114 determined round trip times that differed from each other within a threshold amount (e.g., 10 milliseconds), the ping tests may be verified, and any other data associated with the ping tests may be allowed to proceed as part of the measurement data.

As another example of the verification that may be performed, the measurement data may be compared to determine whether measurement data was due to equipment failure. For example, if an HTTP download test failed to download any data, the verification may determine that the test failed due to equipment failure. The verification may remove data determined based on equipment failure from the measurement data.

As another example of the verification that may be performed, the measurement data may be analyzed to determine presence of an HTTP error code (e.g., HTTP code 504). If an HTTP error code is present, data of the network test associated with the HTTP error code may be removed. For example, if the measurement data indicates a network ping text generated an HTTP code 504, any data of the network ping test may be removed.

The verification may also apply other rules that, when applied, verify one or more conditions associated with the measurement data. An example rule includes a rule that requires the measurement devices (e.g., measurement device 112 and measurement device 114) collected the measurement data with the same configuration and/or settings. For example, the measurement data may indicate an order in which one or more network tests were performed, and the verification may include determining, based on the respective measurement data, that the one or more network tests were performed in the same order at the measurement device 112 and the measurement device 114. Another example rule includes a rule that requires the measurement devices to have collected measurement data or performed the network tests within, along, or associated with the same geographic area or geographic path. For example, measurement data may indicate a geographic area or geographic path associated with one or more network tests, and the verification may include determining, based on the respective measurement data, that the measurement device 112 and the measurement device 114 performed the one or more network tests in association with the same geographic area or geographic path. If the measurement device 112 and the measurement device 114 performed the one or more network tests in association with different geographic areas or geographic paths, the measurement data from one or both of the measurement device 112 and the measurement device 114 may be removed.

The measurement and ranking server(s) may determine which rules to apply and/or which analyses to perform as part of the verification. For example, which rules to apply and/or which analyses to perform may be based on the types of network tests that were performed. The measurement data may be analyzed to determine which types of network tests were performed (e.g., ping test, browser test, HTTP download test, HTTP upload test) and, based on which tests, the rules and/or analyses to perform may be determined. The rules and/or analyses may be associated with various network tests (e.g., one or more rules and/or one or more analyses may be associated with a ping test). In this way, one or more first rules and one or more first analyses may be determined if the measurement data indicates that a first type of network test was performed, and one or more second rules and one or more second analyses may be determined if the measurement data indicates that a second type of network test was performed. The one or more first rules may differ from the one or more second rules based on inclusion of an additional or alternative rule. The one or more second analyses may differ from the one or more second analyses based on inclusion of an additional or alternative analysis. As one particular example, if the measurement data indicates that a ping test was performed, one or more rules or analyses that verify a ping test may be determined. The rules and/or analyses may also be preconfigured by an operator. For example, if the measurement and ranking server(s) is to verify based on presence of an HTTP error code, an operator may configure the measurement and ranking server(s) to apply one or more rules or analyses that verify based on presence of an HTTP error code.

At 247, the measurement and ranking server(s) may generate one or more data records based on the measurement data. The one or more data records may include any measurement data that passed the verification performed in connection with item 245. In this way, verified measurement data may be later used as a basis for determining a ranking.

At 249, the measurement and ranking server(s) may store the one or more data records. The one or more data records may be stored in a database for later access (e.g., database 122).

Additionally, the verification may be performed by a controller device instead of the measurement and ranking server(s). For example, based on the one or more measurement devices sending the measurement data to the controller device, the controller device may perform the verification, similar to what's described above, to identify and remove any inaccurate or unreliable data from the measurement data. Once the verification is complete, the controller device may send the verified measurement data to the measurement and ranking server(s), and upon receipt, the measurement and ranking service(s) may proceed with 247 and 249, by generating and storing one or more data records based on the verified measurement data.

Items 251-257 of FIG. 2D show an example where one or more surveys are determined and distributed to users. Based on the one or more surveys, survey result data may be received and stored. Beginning at 251, the measurement and ranking server(s) may determine one or more surveys. A survey may include one or more questions regarding a user's preference, such as the user's daily usage of services. Some example questions, for example, may include a question asking for identification of the user's most-used service or a question asking for identification of the service that is most important to the user. Each question may be associated with multiple choices for a user to select (e.g., a listing of services) that allow the user to identify their answer to the question. A survey may include one or more questions associated with a user's satisfaction with their current service provider. The one or more questions may be based on one or more services including, for example, a video data service, a voice call service, Internet data service, and the like. Some example questions, for example, may include a question asking whether the user is satisfied with their voice call service's call drop rate, their voice call service's coverage, their Internet data service's speed, and/or their video streaming service's quality. Each question may be associated with multiple choices for a user to select (e.g., very satisfied, fairly satisfied, fairly unsatisfied, very unsatisfied, do not know) that allow the user to indicate their level of satisfaction for the service. A survey may include on or more questions associated with a user type (e.g., a consumer or business user). One example question may include a question asking what the user primarily uses services for (e.g., whether the user primarily uses services for business or private use). Each question may be associated with multiple choices for a user to select that allow the user to indicate their primary type (e.g., indicate whether the user primarily uses services for business or private use).

Based on the above, a question may be associated with a user preference or a user satisfaction. In this way, each question, when answered by a user, may provide survey result data indicative of user satisfaction with a current service provider (e.g., survey result data that indicates whether a user is satisfied or not satisfied with the current service provider) and/or survey result data indicative of user preference (e.g., survey result data that indicates whether an aspect of network performance is important to the user). Table I provides examples of the types of questions included in a survey. Additionally, for each question, example aspects of network performance that relate to the type of question are provided. Example aspects of network performance may include, for example, a service, a wireless network's data speed, or a wireless network's reliability. For each question, example survey result data is also provided.

TABLE I

Examples of Questions Included In a Survey

| Example Question Type | Example Aspects of Network Performance | Example Survey Result Data |
| --- | --- | --- |
| Voice call reliability | Wireless network reliability; voice call service | An indication of whether a user is satisfied or not satisfied with the current service provider's voice call reliability; an indication of whether voice call reliability is important to the user |
| Voice call coverage | Wireless network reliability; voice call service | An indication of whether a user is satisfied or not satisfied with the current service provider's voice call coverage; an indication of whether voice call coverage is important to the user |
| Voice call quality | Wireless network data speed; wireless network reliability; voice call service | An indication of whether a user is satisfied or not satisfied with the current service provider's voice call quality; an indication of whether voice call quality is important to the user |
| Voice call connection time | Wireless network data speed; voice call service | An indication of whether a user is satisfied or not with the current service provider's voice call connection time; |

TABLE I-continued

Examples of Questions Included In a Survey

| Example Question Type | Example Aspects of Network Performance | Example Survey Result Data |
|---|---|---|
| | | an indication of whether voice call connection time is important to the user |
| Video call quality | Wireless network data speed; wireless network reliability; video call service | An indication of whether a user is satisfied or not with the current service provider's video call quality; an indication of whether voice call quality is important to the user |
| Data throughput | Wireless network data speed; Internet data service | An indication of whether a user is satisfied or not with the current service provider's data throughput; an indication of whether data throughput is important to the user |
| Data downloads | Wireless network data speed; Internet data service | An indication of whether a user is satisfied or not with the current service provider's data downloads; an indication of whether data download speed is important to the user |
| Data uploads | Wireless network data speed | An indication of whether a user is satisfied or not with the current service provider's data uploads; an indication of whether data upload speed is important to the user |
| Video streaming quality | Wireless network data speed; video data service | An indication of whether a user is satisfied or not with the current service provider's video streaming quality; an indication of whether video streaming quality is important to the user |
| Smoothness of video display | Wireless network data speed; wireless network reliability; video data service | An indication of whether a user is satisfied or not with the current service provider's smoothness of video display; an indication of whether smoothness of video display is important to the user |
| Initial time to start video | Wireless network data speed; video data service; | An indication of whether a user is satisfied or not with the current service provider's time to start video from the user's request; an indication of whether an initial time to start video display is important to the user |
| Music streaming quality | Wireless network data speed; wireless network reliability; audio data service | An indication of whether a user is satisfied or not with the current service provider's music streaming quality; an indication of whether music streaming quality is important to the user |
| Internet data reliability | Wireless network data speed; wireless network reliability; Internet data service | An indication of whether a user is satisfied or not with the current service provider's Internet data reliability; an indication of whether Internet data reliability is important to the user |
| Internet coverage | Wireless network reliability; Internet data service | An indication of whether a user is satisfied or not with the current service provider's Internet coverage; an indication of whether Internet coverage is important to the user |
| Text message reliability | Wireless network reliability; wireless network data speed; text message service | An indication of whether a user is satisfied or not with the current service provider's text message quality; an indication of whether test message quality is important to the user |
| Data reliability | Wireless network reliability; Internet data service | An indication of whether a user is satisfied or not with the current service provider's data reliability; an indication of whether data reliability is important to the user |
| Call drop frequency | Wireless network reliability; voice call service; video call service | An indication of whether a user is satisfied or not with the current service provider's call drop frequency; an indication of whether call drop frequency is important to the user |
| Call connection success rate | Wireless network reliability; voice call service; video call service | An indication of whether a user is satisfied or not with the current service provider's call connection success rate; an indication of whether call connection success rate is important to the user |
| Coverage | Wireless network | An indication of whether a user is |

TABLE I-continued

Examples of Questions Included In a Survey

| Example Question Type | Example Aspects of Network Performance | Example Survey Result Data |
|---|---|---|
| | reliability | satisfied or not with the current service provider's coverage; an indication of whether coverage is important to the user |
| Usage | Wireless network data speed; wireless network reliability | An indication of the user's most important aspects of network performance based on, for example, selections from a listing of the question types other than usage (e.g., call drop frequency, video streaming quality, coverage, etc.); an indication of the user's most used services based on, for example, selections from a listing of services (e.g., video data service, video call service, voice call service, audio data service, etc.); and indication of the user type based on, for example, a selection that indicates whether the user is a consumer (e.g., primarily uses the wireless network for private use) or a business user (e.g., primarily uses the wireless network for business use). |

At 253, the measurement and ranking server(s) may send the one or more surveys. The one or more surveys may be sent to users of many different service providers including, for example, the first service provider and the second service provider of FIG. 1. For example, the survey may be sent to a few thousand users. As shown in FIG. 2D, the one or more surveys are sent to the one or more user devices 120. The one or more surveys may sent to the one or more user devices 120 via email, via download requests, or via some other form of electronic communication. Further, the one or more surveys may be published as one or more web pages that the one or more user devices 120 can access, and the one or more surveys may be sent to the one or more user devices 120 based on one or more requests for the one or more web pages.

At 255, the one or more user devices 120 may determine survey result data based on the one or more surveys. This determination may be performed based on users' completing the one or more surveys by answering the questions. The survey result data may indicate each user's answers to the questions of the one or more surveys.

At 257, the one or more user devices 120 may send the survey result data to the measurement and ranking server(s). The survey result data may be sent via email communication, via upload requests, or via user interactions with one or more web pages.

Upon receipt, the survey result data may be stored in a database for later access (e.g., database 122). Further, the survey result data may be processed prior to storing. For example, and incomplete survey result data for a survey may be removed. In this way, only survey result data for surveys that are completely answered may be stored.

Items 259-277 of FIGS. 2D and 2E show an example where one or more rankings are determined and distributed to one or more users and/or one or more service providers. A ranking may be determined based on measurement data (e.g., as determined based on the measurement device tests of measurement device 112 and measurement device 114); based on other test result data (e.g., as determined based on the measurement device tests of measurement device 112 and measurement device 114); based on the survey result data of the one or more surveys; and/or based on other network performance data. Beginning at 259, the measurement and ranking server may send one or more requests for network performance data. These requests may be for network performance data that was determined by one or more service providers. As shown in FIG. 2D, a request for network performance data is sent to the server 121 of the first service provider, and a request for network performance data is sent to the server 119 of the second service provider.

At 261 of FIG. 2E, the server 121 of the first service provider may send network performance data associated with the wireless network 103. The network performance data may have been determined by one or more devices associated with the first service provider (e.g., devices of the core network) and may include one or more measurements, metrics or other data similar to those discussed in connection with the measurement devices. In other words, the network performance data sent by the server 121 may include data similar to the measurement data and other test result data sent by a measurement device. After being received by the measurement and ranking server(s), the network performance data sent by the server 121 may be subject to a verification process similar to the discussion of 245 of FIG. 2C.

At 263, the server 119 of the first service provider may send network performance data associated with the wireless network 104. The network performance data may have been determined by one or more devices associated with the second service provider (e.g., devices of the core network) and may include one or more measurements, metrics or other data similar to those discussed in connection with the measurement devices. In other words, the network performance data sent by the server 119 may include data similar to the measurement data and other test result data sent by a measurement device. After being received by the measurement and ranking server(s), the network performance data sent by the server 119 may be subject to a verification process similar to the discussion of 245 of FIG. 2C.

At 265, the measurement and ranking server(s) may determine one or more user types. A consumer (e.g., a user that primarily consumes services for private use) and a business user (e.g., a user that primarily consumes service for business use) are two examples of a user type discussed throughout this disclosure. Other examples of a user type may include, for example, an age range of a user (e.g., 18-29 year olds); gender (e.g., male or female); or some other user type based on demographic information. This determination may be performed based on input from an operator or other user associated with the measurement and ranking server(s). The input may indicate or otherwise define the one or more user types. Further, this determination may be based on a survey or survey result data associated with one or more surveys. For example, the survey may include a question related to a user's usage. The question may ask for a user to identify how a wireless network is primarily used (e.g, for private use or for business use) and the user, to answer the question, may select from one or more selectable options. Each of the selectable options may indicate a user type (e.g., private use may indicate a consumer; business use may indicate a business user). The measurement and ranking server(s) may determine one or more user types for each of the options selectable by the user.

At 267, the measurement and ranking server(s) may determine one or more ranking profiles. A ranking profile may include an indication of measurement data, an indication of survey result data associated with the one or more surveys, and an indication of network performance data that will form the basis for a ranking determined based on the ranking profile. Each ranking profile may indicate its own set or mix of measurement data, survey result data, and network performance data. In this way, a ranking profile may be for determining a ranking of certain aspects of network performance. As some examples, one ranking profile may be for determining a ranking of a video data service. Another ranking profile may be for determining a ranking of wireless network data speed. Yet another ranking profile may be for determining a ranking of wireless network reliability. Table II provides examples of ranking profiles. Additionally, for each ranking profile, example indications of measurement data, survey result data, and network performance data are provided. The example indications provide a listing of the factors that may be analyzed to determine the ranking based on the example ranking profile. Further, a number of the example indications provide are discussed in terms of a general "one or more measurements". The one or more measurements may indicate different volumes of data. For example, one or more measurements of data download speed may include a measurement for downloading 4 megabytes of data, a measurement for downloading 200 kilobytes of data, or the like. The one or more measurements may indicate other measurements such as a time from a request to display a video stream, a time for a wireless network to process a call and initiate the connection, or other measurement included by the measurement data or network performance data. In general, a ranking profile may include an indication of any measurement, metric or other test result data that was determined based on a network test.

TABLE II

Examples of Ranking Profiles

| Example Ranking Profiles | Example Indications of Measurement Data, Survey Result Data, and Network Performance Data |
| --- | --- |
| Overall Network Performance | Voice service mean opinion score (determined based on survey result data); access time (determined based on survey result data); one or more measurements of data download speeds (determined based on measurement data and/or network performance data); one or more measurements of data upload speeds (determined based on measurement data and/or network performance data); video service mean opinion score (determined based on survey result data); video service stream freezing (determined based on survey result data); one or more measurements indicating video service start time (determined based on measurement data and/or network performance data); wireless network coverage satisfaction (determined based on survey data); wireless network access satisfaction (determined based on survey result data); wireless network retainability satisfaction (determined based on survey data); and one or more measurements of network test failure or success (determined based on measurement data and/or network performance data) |
| Video Service Performance | One or more measurements indicating video service start time (determined based on measurement data and/or network performance data); one or more measurements indicating test failure or success for a video data service (determined based on measurement data and/or network performance data); video service mean opinion score (determined based on survey result data); video service stream freezing (determined based on survey result data) |
| Voice Service Performance | Voice service mean opinion score (determined based on survey result data); one or more measurements of voice call setup time(determined based on measurement data and/or network performance data); wireless network access satisfaction (determined based on survey result data); wireless network retainability satisfaction (determined based on survey result data) |
| Voice Service Quality | Voice service mean opinion score (determined based |

TABLE II-continued

Examples of Ranking Profiles

| Example Ranking Profiles | Example Indications of Measurement Data, Survey Result Data, and Network Performance Data |
|---|---|
| Wireless Network Reliability | on survey result data); one or more measurements of voice call setup time (determined based on measurement data and/or network performance data); Wireless network access satisfaction (determined based on survey result data); wireless network retainaibility satisfaction (determined based on survey result data); one or more measurements of network test failure or success (determined based on measurement data and/or network performance data); voice service coverage satisfaction (determined based on survey result data); voice service accessibility (determined based on survey result data); voice service retainability (determined based on survey result data) |
| Social Media Performance | One or more measurements of social network service data speeds (determined based on measurement data and/or network performance data); one or more indications of network test failure or success (determined based on measurement data and/or network performance data) |
| Data Service Performance | One or more measurements of data download speeds (determined based on measurement data and/or network performance data); one or more measurements of data upload speeds (determined based on measurement data and/or network performance data); video service mean opinion score (determined based on survey result data); video service stream freezing (determined based on survey result data); one or more measurements indicating video service start time (determined based on measurement data and/or network performance data); one or more measurements of network test failure or success (determined based on measurement data and/or network performance data) |
| Data Speed Performance | One or more measurements of data download speeds (determined based on measurement data and/or network performance data); one or more measurements of data upload speeds (determined based on measurement data and/or network performance data) |

A ranking profile may be associated with a user type. For example, a first user type (e.g., consumer) may be associated with its own set of one or more ranking profiles (e.g., a first set of ranking profiles that includes one or more of the example profiles listed in Table II). A second user type (e.g., a business user) may be associated with its own set of one or more ranking profiles (e.g., a second set of ranking profiles that includes one or more of the example profiles listed in Table II). The first set of profiles and the second set of profiles may be different from each other. For example, the second set of profiles may include a profile for determining a ranking of a voice call service, but the first set of profiles may not include any profile for determining a ranking of a voice call service.

This determination of one or more ranking profiles may be performed based on input from an operator or other user associated with the measurement and ranking server(s). The input may indicate or otherwise define the one or more ranking profiles. Further, this determination may be based on a survey or survey result data associated with one or more surveys. For example, the measurement and ranking server(s) may analyze the survey result data of the one or more surveys. The analysis may include determining survey result data associated with a user type (e.g., if the user, in answering a survey, indicates that they primarily use wireless networks for private use, all other survey result data generated based on the user's answers to the other questions of the survey may be associated with the consumer user type). Based on the survey result data associated with the user type, the most important aspects of network performance may be identified and a ranking profile may be determined to include indications of measurement data, survey result data, and network performance data that are associated with the most important aspects of network performance.

For example, assume that the survey result data can be divided into two user types: first survey result data associated with a consumer, and second survey result data associated with a business user. Based on the first survey result data, video data service may be determined as important to a consumer. Accordingly, one or more profiles may be determined for determining a ranking of video data service. Based on the second survey result data, voice call service may be determined as important to a business user. Accordingly, one or more profiles may be determined for determining a ranking of voice call service.

At 269, the measurement and ranking server(s) may determine, for each of the one or more ranking profiles, one or more weights. The one or more weights may be used for determining a ranking and may adjust the importance of aspects of network performance relative to other aspects of network performance. In other words, a weight may have a value that adjusts the importance of an aspect of network performance. Each aspect may be associated with its own weight (e.g., voice service reliability satisfaction may be associated with a first weight; voice service reliability satisfaction may be associated with a second weight). Alternatively, a weight may be associated with a source of the aspect of network performance. For example, the aspects determined based on the survey result data may be associated with a first weight, and the aspects determined based on the measurement data and/or the network performance data may be associated with a second weight. In this way, the importance of the survey result data can be adjusted relative to the importance of the measurement data and/or the network performance data. The one or more weights may be in decimal form (e.g., a value between 0.01 and 0.99) and may be normalized (e.g., so the one or more weights sum up to 1.00).

This determination of one or more weights may be performed based on input from an operator or other user associated with the measurement and ranking server(s). The input may indicate or otherwise define, for each ranking profile, the one or more weights. Further, this determination may be based on a survey or survey result data associated with one or more surveys. For example, the measurement and ranking server(s) may analyze the survey result data of the one or more surveys. The analysis may include determining survey result data associated with a user type (e.g., if the user, in answering a survey, indicates that they primarily use wireless networks for private use, all other survey result data generated based on the user's answers to the other questions of the survey may be associated with the consumer user type). Based on the survey result data associated with the user type, the most important aspects of network performance may be identified and, based on the most important aspects of network performance, values for the one or more weights may be determined. For example, if consumers indicate that video service data speed is one of the most important aspects of network performance, a weight associated with video service data speed may be assigned a value that is higher than a weight associated with an aspect consumer's consider less important.

At 271, the measurement or ranking server(s) may determine, based on the one or more ranking profiles, one or more rankings. A ranking may indicate performance of a wireless network relative to at least one other wireless network. A ranking may be determined for each of the one or more ranking profiles. For example, if the one or more rankings include a first set of ranking profiles associated with a consumer and a second set of ranking profiles associated with a business user, a ranking may be determined for each ranking profile of the first set and for each ranking profile of the second set. In this way, a ranking may be based on a user type and based on one or more aspects of network performance.

Determining a ranking may include, based on a ranking profile, analyzing the measurement data, survey result data, and/or network performance data. Based on the analysis, scores for one or more wireless networks may be determined. The one or more weights associated with the ranking profile may be applied to the scores. The weighted scores for each wireless network may be combined together, and the combined scores for the one or more wireless networks may be compared to each other. Based on the comparison, the one or more wireless networks may be ranked.

As one example of determining a ranking, based on a voice service quality ranking profile (as discussed in Table II) that is associated with a consumer, a ranking of the wireless networks 103 and 104 may be determined. Based on the voice service quality ranking profile, the survey result data may be analyzed to determine a first voice service satisfaction mean opinion score for the wireless network 103; and the measurement data and/or the network performance data may be analyzed to determine one or more first measurements of voice call setup time for the wireless network 103. Similarly, the survey result data may be analyzed to determine a second voice service satisfaction mean opinion score for the wireless network 104; and the measurement data and/or the network performance data may be analyzed to determine one or more second measurements of voice call setup time for the wireless network 104.

Further, analyzing the measurement data, survey result data, and/or network performance data may include performing a normalization on the analyzed data. These normalized values may be the scores for the one or more wireless networks. For example, based on the above, some of the measurement data and/or network performance data may be measurements with a numeric value. The numeric values of the measurements, however, may differ in scale or type. For example, the numeric value may indicate a time duration, a percentage or a rate of speed. Further, some of the survey result data may be answers to multiple choice questions. To be able to combine the data into a score that can be compared, the measurement data, survey result data, and/or network performance data may be normalized based on a common scale (e.g., 0 to 100). Some of the data may be normalized based on a step-wise conversion. For example, the answers to multiple choice questions may be converted to values of the common scale, such as an unsatisfied answer being converted to a value of 10, a neutral answer being converted to a value of 50, and a satisfied answer being converted to a value of 90. Some of the data may be normalized based on a combination of thresholds and linear conversion. For example, a measurement having a value that does not satisfy a first threshold may be converted to a value of 10 (e.g., if a measurement for starting a video stream indicates that the stream was started in 10 or more seconds, the measurement may be converted to a value of 10). A measurement having a value that does not satisfy a second threshold may be converted to a value of 100 (e.g., if a measurement for starting a video stream indicates that the stream was started in 3 or fewer seconds, the measurement may be converted to a value of 100). A measurement having a value that satisfies both the first and second thresholds, may be converted to a value between 10 and 100 (e.g., if a measurement for starting a video stream indicates that the stream was started in more than 3 seconds but less than 10 seconds, the measurement may be converted to a value between 10 and 100). As another example of normalizing based on thresholds and linear conversions, a measurement for a download throughput may be converted to a value between 0 and 90 for throughputs ranging from 500 kilobytes per second to 8000 kilobytes per second. For throughputs ranging from 8000 to 13000 kilobytes per second, the measurement may be converted to a value between 90-100.

After determining the scores for the wireless networks, the one or more weights may be applied to the scores. For example and continuing the example of the voice service quality ranking profile, the normalized first voice service mean opinion score for the wireless network 103 may be multiplied by a first weight. The one or more normalized first measurements of voice call setup time for the wireless network 103 may be applied with a second weight. Similarly, the normalized second voice service mean opinion score for the wireless network 104 may be multiplied by the first weight. The one or more normalized second measurements of voice call setup time for the wireless network 104 may be multiplied by the second weight.

After applying the one or more weights to the scores, the weighted scores may be combined. For example and continuing the example of the voice service quality ranking profile, the normalized and weighted first voice service mean opinion score for the wireless network 103 may be combined with the one or more normalized and weighted first measurements of voice call setup time for the wireless network 103. Similarly, the normalized and weighted second voice service mean opinion score for the wireless network 104 may be combined with the one or more normalized and weighted second measurements of voice call setup time for the wireless network 104. Combining may include summing the normalized and weighted values.

After combining the normalized and weighted scores together, the combined scores for the one or more wireless networks may be compared to each other (e.g., compare the values to each other or perform a statistical analysis). For example and continuing the example of the voice service quality ranking profile, the combined score for the first wireless network 103 may be compared to the combined score to the second wireless network 104. This comparison may include a statistical analysis such as, for example, by determining a z-score for each pair of the combined scores. A z-score may take the difference between the scores and divide the scores by an error. The error may be determined based on the one or more weights, the scores (e.g., the normalized values of the measurement data, survey result data, and/or network performance data), and a number of samples. The number of samples may be the number of samples analyzed to determine the score. For example, the number of samples may be the sum of the number of surveys associated with the user type and the number of measurements and/or metrics, from the measurement data and the network performance data, that were used to determine the scores.

Based on the comparison, the one or more wireless networks may be ranked. The ranking may be based on the statistical analysis or otherwise result in the one or more wireless networks being ordered from highest performance to lowest performance. For example and continuing the example of the voice service quality ranking profile, if the first wireless network 103 has a z-score that indicates a higher performance than the wireless network 104, it would be ranked above the wireless network 104.

A ranking may be determined based on other criteria. For example, the ranking may be determined based on one or more geographic areas. In this way, a ranking may be for a particular geographic area and additional rankings may be determined for other geographic areas. The ranking for each geographic area may be performed similar to the above-discussed example of the voice service quality ranking profile, except only measurement data and/or network performance data associated with the geographic area would be analyzed.

As another example of other criteria that may form a basis for determining a ranking, a ranking may be determined based on one or more operating systems of the measurement devices. In this way, the ranking may account for differences in network performance for different measurement devices. The ranking that is based on one or more operating systems may be performed similar to the above-discussed example of the voice service quality ranking profile, except measurement data and/or network performance data associated with a first operating system may be separately analyzed from measurement data and/or network performance data associated with a second operating system. The normalized values for the first operating system may be applied to a first operating system weight (e.g., 0.6) and the normalized values for the second operating system may be applied to a second operating system weight (e.g., 0.4). After the weights have been applied, the normalized and weighted values may be summed. The summed values can then be combined similar to the discussed example.

The above provides an example with respect to a voice service quality ranking profile. Similar processes may be performed to determine a ranking for the other example ranking profiles of Table II. After determining the one or more rankings, the one or more wireless networks may be ranked based on the one or more ranking profiles. Table III provides an example of one or more rankings that may be determined for wireless network 103 and 104 based on the example ranking profiles of Table II. Further, Table III shows that rankings were determined based on a first set of ranking profiles associated with a consumer and a second set of ranking profiles associated with a business user. The number 1 indicates higher performance than the number 2. A "Not Determined" indicates that the ranking profile was not included in the first set or the second set. As indicated by Table III, one or more of the rankings for the consumer may differ from the respective ranking for the business user.

TABLE III

Examples Rankings

| Example Ranking Profiles | Rankings For a Consumer | | Rankings for a Business User | |
| --- | --- | --- | --- | --- |
| | Wireless Network 103 | Wireless Network 104 | Wireless Network 103 | Wireless Network 104 |
| Overall Network Performance | 1 | 2 | 1 | 2 |
| Video Service Performance | Not Tested | Not Tested | 2 | 1 |
| Voice Service Performance | Not Tested | Not Tested | 2 | 1 |
| Voice Service Quality | Not Tested | Not Tested | 2 | 1 |
| Wireless Network Reliability | 1 | 2 | 2 | 1 |
| Social Media Performance | 1 | 2 | Not Tested | Not Tested |
| Service Performance | 1 | 2 | 2 | 1 |
| Data Speed Performance | 2 | 1 | 2 | 1 |

At 273, the measurement and ranking server(s) may send the one or more rankings. Sending the one or more rankings may be performed based on email communication or based on publication on a website. For example, the one or more rankings may be sent in an email to the one or more user devices 120. The one or more rankings may be viewed via the web page based on a request from the one or more user devices 120. As depicted in the example flow, the one or more rankings are shown as being sent to the server 121, the server 119, and the one or more user devices 120.

At 275-277, the devices that receive the one or more rankings may cause display of the one or more rankings. A user of the respective device may be able to view the one or more rankings based on the display.

The above example flow of FIGS. 2A-2E provides a number of examples of the way network tests can be performed and how rankings can be determined. FIGS. 3-5 provide examples of methods that may be performed by the devices discussed in connection with the example flow of FIGS. 2A-2E. For brevity, features more fully discussed in the example flow will be referenced in the various steps of FIGS. 3-5.

FIG. 3 shows an example method for controlling one or more network tests. This method may be performed by a controller device (e.g., controller device 116 or controller device 117). For purposes of the example method of FIG. 3, the controller device will be referred to as a computing device.

At step 301, the computing device may configure itself to operate as a controller device. This may be performed similar to 201 of FIG. 2A. For example, control software may be installed on the computing device. The control software may be able to generate and allow user interaction with a user interface including for example, any of the example displays of FIGS. 7A-7G and 8A-8H. The control software may be configured to enable performance of the remaining steps of FIG. 3.

At step 303, the computing device may determine one or more network tests. This may be performed similar to 207 of FIG. 2A. For example, the one or more network tests may include any or all of the example network tests as shown by display 700 of FIG. 7A. Examples of network tests include a ping test, an HTTP download test, an HTTP upload test, a multithread HTTP download test, a multithread HTTP upload test, a voice call test, a video call test, and a UDP test. A network test may be defined by a type of network test and one or more configuration settings. Further, the one or more network tests may be in an order that defines which test is performed first, which test(s) are performed next, and which test is performed last.

At step 305, the computing device may determine setting information for the one or more network tests. This may be performed similar to 209 of FIG. 2A. The setting information may include, for example, an indication of cycles for the one or more network tests; an indication of one or more servers that will receive the measurement data or other test result data (e.g., a URL for the measurement server 105 or a URL for the measurement and ranking server(s)); an indication of a network type associated with the one or more network tests (e.g., an indication of 3G, 4G, or 5G); and/or an indication of one or more other properties (e.g., an identifier associated with the one or more network tests).

At step 307, the computing device may establish, for one or more measurement devices, a connection to each of the one or more measurement devices. This may be performed similar to 211 of FIG. 2A. Each connection may be a BLUETOOTH connection or a ZIGBEE connection. Communication between the computing device and the one or more measurement devices may be performed via the established connection(s).

At step 309, the computing device may determine, based on the one or more measurement devices and the one or more network tests, one or more measurement device tests. This may be performed similar to 213 of FIG. 2A. For example, each measurement devices test may be assigned or otherwise associated with a particular measurement device. Further, each measurement device test may indicate which of the one or more network tests are to be performed by the measurement device. Each measurement device test may be defined based on a type of network test for each of the one or more network tests, one or more configuration settings for each of the one or more network tests, and setting information for the one or more network tests.

At step 311, the computing device may determine to start the one or more measurement device tests. This may be performed similar to 215 of FIG. 2B. For example, this determination may be performed based on a user interaction indicating a press of a button that allows the user to begin the one or more measurement device tests (e.g., "START JOB" button as shown by FIG. 7G).

At step 313, the computing device may send, to the one or more measurement device, one or more indications of the one or more measurement device tests. This may be performed similar to 217 of FIG. 2B. For example, an indication may be sent to each of the one or more measurement devices. Each indication may include information necessary for the measurement device to perform its measurement device test. In general, an indication may include a type for each network test that is to be performed; one or more configuration settings for each network test that is to be performed; and setting information associated with the one or more network tests that are to be performed.

At step 315, the computing device may receive, from the one or more measurement devices, test status data. This may be performed similar to what the controller device 116 performs based on receiving the test status data from the first measurement device 112 and/or the second measurement device 114. With respect to the example flow of FIGS. 7B and 7C, a controller device is described as receiving test status data in connection with 221, 237 and 238. For example, the test status data may include measurement data determined based on performance of a measurement device's measurement device test (e.g., measurement data determined based on the ping test, measurement data determined based on the HTTP download test, and the like), and other status information associated with a measurement device.

At step 317, the computing device may generate a display based on the test status data. For example, based on the test status data, the computing device may display an indication of the status of the one or more measurement devices and/or a status of the one or more measurement device tests being performed by the one or more measurement devices. Some examples of the displays that may be generated by the computing device are shown by FIGS. 8A-8D.

At step 319, the computing device may determine whether to stop a measurement device test. This determination may be based on a user interaction that indicates a press of a button to stop a particular measurement device test (e.g., example display 870 includes five buttons each labeled "STOP" that can be pressed to individually stop a measurement device test), or a press of a button to stop the one or more measurement device tests (e.g., example displays 800, 810, 820, and 830 of FIGS. 8A-8D show buttons labeled "STOP" that can be pressed to stop all measurement device tests of the one or more measurement devices). Further, this determination may be based on non-receipt of test status data (as discussed in connection with items 219-227 of FIG. 7B). If the computing device determines to stop one or more measurement device tests, the method may proceed to step 321. An example of determining to stop one or more measurement device tests is discussed in connection with 223 of FIG. 2B. If the computing device determines not to stop one or more measurement device tests, the method may proceed to step 323. An example of determining not to stop one or more measurement devices is discussed in connection with 233-242 of FIG. 2C.

At 321, the computing device may send one or more indications to stop at least one measurement device test. This may be performed similar to 225 of FIG. 2B. Further, which measurement devices are sent an indication to stop may be based on which type of button was pressed by the user at step 319. In some instances, a single measurement device may be sent an indication to stop its measurement device test. In other instances, each of the one or more measurement devices may be sent an indication to stop its measurement device test.

At 323, the computing device may determine whether the one or more measurement device tests are complete. This determination may be based on receiving an indication, from the one or more measurement devices, that the one or more measurement device tests are complete. If the one or more measurement device tests are complete, the method may proceed to step 315 to continue receiving test status data based on performance of the one or more measurement device tests. If the one or more measurement device tests are not complete, the method may end.

FIG. 4 shows an example method for performing one or more network tests. This method may be performed by a measurement device (e.g., measurement devices 112-115). For purposes of the example method of FIG. 4, the measurement device will be referred to as a computing device.

At step 401, the computing device may configure itself to operate as a measurement device. This may be performed similar to 203 or 205 of FIG. 2A. For example, the computing device may install measurement software. The measurement software may be configured to enable performance of the remaining steps of FIG. 4.

At step 403, the computing device may receive, from a controller device, an indication of a measurement device test. This may be performed similar to what the first measurement device 112 and the second measurement device 114 perform based on receiving an indication of a measurement device test from the controller device 116. With respect to the example flow of FIGS. 7B and 7C, the first measurement device 112 and the second measurement device 114 are described as receiving an indication of a measurement device test in connection with 217 and 231. The indication of a measurement device test may cause the computing device to perform the measurement device test based on a common window (e.g., the computing device may begin its measurement device test at the same or similar time as another measurement device, such as within 1 second of each other; may perform its measurement device test in parallel or synchronously with another measurement device; and may complete its measurement device test at the same or similar time as another measurement device). In other words the computing device and at least one other measurement device may be performing their measurement device tests based on the common window.

At step 405, the computing device may initiate the measurement device test. This may be performed similar to any one of 219, 233, and 235 of FIGS. 2B and 2C. For example, initiating the measurement device test may include beginning a process that performs a set of one or more network tests, as defined by the measurement device test. Further, because the set of one or more network tests may be in an order, initiating the measurement device test may include starting the first network test in the order.

At step 407, the computing device may determine and store data based on the measurement device test. With respect to the example flow of FIGS. 7B and 7C, the first measurement device 112 would be determining and storing data in connection with 219-221 of FIG. 7B and 233, 237, 238, and 241 of FIG. 7C. The second measurement device 114 would be determining and storing data in connection with 235, 238, 240, and 242 of FIG. 7C. The determined and stored data may include, for example, measurement data and other test result data; or other data that may be used to determine the measurement data and other test result data. Measurement data and other test result data are described in connection with 241 and 242 of FIG. 2C. For example, the measurement data may include one or more measurements, one or more metrics, or other data that was determined by performing each network test of the measurement device test. The other test result data may include, for example, an indication of the computing device's operating system, an indication of a geographic area where its measurement device test was performed, an indication of the service provider associated with the wireless network that the computing device was communicating with to perform a network test; and/or an indication of which network tests were performed by the computing device.

At step 409, the computing device may send test data. This may be performed similar to any one of 221, 237, or 238 of FIGS. 2B and 2C. The test status data may include, for example, measurement data determined based on performance of the measurement device test (e.g., measurement data determined based on the ping test, measurement data determined based on the HTTP download test, and the like), and other status information associated with the computing device.

At step 411, the computing device may determine whether to stop the measurement device test. This may be performed similar to what the first measurement device 112 perform based on receiving an indication to stop a measurement device test from the controller device 116. With respect to the example flow of FIG. 7B, the first measurement device 112 is described as receiving an indication to stop a measurement device test in connection with 225. For example, this determination may be based on receipt of an indication to stop a measurement device test from the controller device. If an indication to stop the measurement device test has been received, the computing device may determine to stop the measurement device test and may proceed to 415. If an indication to stop the measurement device test has not been received, the computing device may determine not to stop the measurement device test and may proceed to 413.

At step 413, the computing device may determine whether the measurement device test is complete. This may be performed similar to any one of 239 and 240 of FIG. 2C. For example, a measurement device test may be complete based on completion of each network test in a cycle and based on there being no more cycles left to perform. In other words, a measurement device test may be complete if there are no more network tests to perform or all network tests have been completed. If the computing device determines that the measurement device test is complete, the method may proceed to step 417.

If the computing device determines that the measurement device test is not complete, the method may proceed to step 407 to continue performing the measurement device test. Steps 407 and 409 may be repeatedly performed as the measurement device test continues to be performed. Further, as different network tests are performed in connection with the measurement device test, data based on the different network tests may be determined and stored, and test status data base don the different network tests may be sent.

At step 415, the computing device may stop the measurement device test. This may be performed similar to 227 of FIG. 2B. For example, stopping the measurement device test may include ceasing to perform a network test currently in progress, stopping any remaining network tests from being performed, and stopping any remaining cycles from being performed.

At step 417, the computing device may determine measurement data associated with the measurement device test. The measurement data may be based or include the data determined based on the iterations of step 407. Measurement data is described in connection with 241 and 242 of FIG. 2C. For example, the measurement data may include one or more measurements, one or more metrics, or other data that was determined by performing each network test of the measurement device test.

At step 419, the computing device may send the measurement data. This may be performed similar to any one of 241 or 242 of FIG. 2C. For example, the measurement data may be sent to a measurement server. Further, the measurement data may be sent to a controller device. The measurement data may be accompanied by other test result data. The other test result data was discussed in connection with 341 and 242 of FIG. 2C. The other test result data may include, for example, an indication of the computing device's operating system, an indication of a geographic area where its measurement device test was performed, an indication of the service provider associated with the wireless network that the computing device was communicating with to perform a network test; and/or an indication of which network tests were performed by the computing device.

FIG. 5 shows an example method for receiving data based on the one or more network tests and for determining one or more network rankings. This method may be performed by a measurement server, a ranking server, or a measurement and ranking server (e.g., measurement server 105, ranking server 106, or the measurement and ranking server(s) as discussed in connection with the example flow of FIGS. 2A-2E). For purposes of the example method of FIG. 5, the measurement server, the ranking server, or the measurement and ranking server will be referred to as one or more computing devices.

At step 501, the one or more computing device may receive, from one or more measurement devices, measurement data. This may be performed similar to what the measurement and ranking server(s) perform based on receiving measurement data from the first measurement device 112 and the second measurement device 114. With respect to the example flow of FIG. 7C, the measurement and ranking server(s) is described as receiving measurement data in connection with 241 and 242. The measurement data may be accompanied by other test result data.

At step 503, the one or more computing devices may perform verification of the measurement data. This may be performed similar to 245 of FIG. 7D. The verification may be performed to identify and remove any inaccurate or unreliable data from the measurement data. The measurement data may be compared to determine consistency between network tests. The verification may remove inconsistent data from the measurement data. The measurement data may be compared to determine whether measurement data was due to equipment failure. The verification may remove data determined based on equipment failure from the measurement data.

At step 505, the one or more computing devices may generate one or more data records based on the measurement data. This may be performed similar to 247 of FIG. 7D. For example, the one or more data records may include any measurement data that passed the verification performed in connection with step 503. In this way, verified measurement data may be later used as a basis for determining a ranking.

At step 507, the one or more computing devices may store the one or more data records. This may be performed similar to 249 of FIG. 7D. For example, the one or more data records may be stored in a database.

At step 509, the one or more computing devices may determine one or more surveys. This may be performed similar to 251 of FIG. 7D. For example, a survey may include one or more questions regarding a user's preference, such as the user's daily usage of services. A survey may include one or more questions associated with a user's satisfaction with their current service provider. A survey may include on or more questions associated with a user type (e.g., a consumer or business user). Each question, when answered by a user, may provide survey result data indicative of user satisfaction with a current service provider (e.g., survey result data that indicates whether a user is satisfied or not satisfied with the current service provider) and/or survey result data indicative of user preference (e.g., survey result data that indicates whether an aspect of network performance is important to the user). Table I provides examples of types of questions and examples of survey result data.

At step 511, the one or more computing devices may send the one or more surveys. This may be performed similar to 253 of FIG. 7D. For example, the one or more surveys may sent to the one or more user devices 120 via email, via download requests, or via some other form of electronic communication. Further, the one or more surveys may be published as one or more web pages. The one or more surveys may be sent based on one or more requests for the one or more web pages.

At step 513, the one or more computing devices may receive survey result data based on the one or more surveys. This may be performed similar to what the measurement and ranking server(s) perform based on receiving survey result data from the one or more user devices 120. With respect to the example flow of FIG. 7D, the measurement and ranking server(s) is described as receiving survey result data in connection with 257. The survey result data may be based on users' completing the one or more surveys. The survey result data may indicate each user's answers to the questions of the one or more surveys. The survey result data may be stored in a database for later access. Further, the survey result data may be processed prior to storing. For example, and incomplete survey result data for a survey may be removed. In this way, only survey result data for surveys that are completely answered may be stored.

At step 515, the one or more computing devices may send one or more requests for network performance. This may be performed similar to 259 of FIG. 2D. For example, each request may be for network performance data that was determined by one or more service providers.

At step 517, the one or more computing devices may receive network performance data. This may be performed similar to what the measurement and ranking server(s) perform based on receiving network performance data from the server 121 and the server 119. With respect to the example flow of FIG. 7E, the measurement and ranking server(s) is described as receiving network performance data in connection with 261 and 263. For example, the network performance data may have been determined by one or more devices associated with the a service provider (e.g., devices of the core network) and may include one or more measurements, metrics or other data similar to those discussed in connection with the measurement devices. In other words, the network performance data may include data similar to the measurement data and other test result data sent by a measurement device. The network performance data may be verified similar to the verification performed at step 503.

At step 519, the one or more computing devices may determine one or more user types. This may be performed similar to 265 of FIG. 7E. A consumer (e.g., a user that primarily consumes services for private use) and a business user (e.g., a user that primarily consumes service for business use) are two examples of a user type.

At step 521, the one or more computing devices may determine, for each of the one or more user types, one or more ranking profiles. This may be performed similar to 267 of FIG. 7E. For example, a ranking profile may include an indication of measurement data, an indication of survey result data associated with the one or more surveys, and an indication of network performance data that will form the basis for a ranking determined based on the ranking profile. Each ranking profile may indicate its own set or mix of measurement data, survey result data, and network performance data. In this way, a ranking profile may be for determining a ranking of certain aspects of network performance. For each user type, the one or more ranking profiles may include a ranking profile similar to the examples provided by Table II. If there are two user types, for example, a first user type (e.g., consumer) may be associated with a first set of one or more ranking profiles, and a second user type (e.g., a business user) may be associated with a second set of one or more ranking profiles.

At step 523, the one or more computing devices may determine, for each of the one or more ranking profiles, one or more weights for the ranking profile. This may be performed similar to 269 of FIG. 7E. For example, one or more weights may, for a ranking profile, adjust the importance of aspects of network performance relative to other aspects of network performance. In other words, a weight may have a value that adjusts the importance of an aspect of network performance. Each aspect of network performance associated with a ranking profile may be associated with its own weight (e.g., voice service reliability satisfaction may be associated with a first weight; voice service reliability satisfaction may be associated with a second weight). Alternatively, a weight may be associated with a source of the aspect of network performance. For example, the aspects determined based on the survey result data of one or more surveys may be associated with a first weight, and the aspects determined based on the measurement data and/or the network performance data may be associated with a second weight. In this way, the importance of the survey result data can be adjusted relative to the importance of the measurement data and/or the network performance data. The one or more weights may be in decimal form (e.g., a value between 0.01 and 0.99) and may be normalized (e.g., so the one or more weights sum up to 1.00).

At step 525, the one or more computing devices may determine, based on the one or more ranking profiles, one or more rankings. This may be performed similar to 271 of FIG. 7E. A ranking may indicate performance of a wireless network relative to at least one other wireless network. Further, determining a ranking may include, based on a ranking profile, analyzing the measurement data, survey result data, and/or network performance data. Based on the analysis, scores for one or more wireless networks may be determined. The one or more weights associated with the ranking profile may be applied to the scores. The weighted scores for each wireless network may be combined together, and the combined scores for the one or more wireless networks may be compared to each other. Based on the comparison, the one or more wireless networks may be ranked. This process may be repeated for each ranking profile. Further, each ranking profile may generate two or more rankings (e.g., if the rankings are determined based on one or more geographic areas). Further, one or more rankings may be determined for each of the one or more user types. For example, if there are two user types, there may be a first set of rankings associated with a first user type (e.g., consumer) and a second set of rankings associated with a second user type (e.g., a business user). Table III provides an example of one or more rankings.

At step 527, the one or more computing devices may send the one or more rankings. This may be performed similar to 273 of FIG. 7E. For example, sending the one or more rankings may be performed based on email communication or based on publication on a website. In this way, users may be able to view the one or more rankings.

Any of the method steps, operations, procedures or functions described herein may be implemented using one or more processors and/or one or more memory in combination with computer executable instructions that cause the one or more processors and other components to perform various method steps, described features, or other aspect described herein. FIG. 6 illustrates an example apparatus, in particular a computing device 612, that may be used in a communication network such as the one shown in FIG. 1, to implement any or all of the devices, servers and other equipment to perform the steps described above and in FIGS. 2A-2E, 3, 4, 5, 7A-7G, and 8A-8H. Computing device 612 may include a controller 625. The controller 625 may be connected to a user interface control 630, display 636 and/or other elements as shown. Controller 625 may include circuitry, such as for example one or more processors 628 and one or more memory 634 storing software 640 (e.g., computer executable instructions). The software 640 may comprise, for example, one or more of the following software options: user interface software, server software, etc., including a radio protocol stack, etc.

Device 612 may also include a battery 650 or other power supply device, speaker 653, and one or more antennae 654. Device 612 may include user interface circuitry, such as user interface control 630. User interface control 630 may include controllers or adapters, and other circuitry, configured to receive input from or provide output to a keypad, touch screen, voice interface—for example via microphone 656, function keys, joystick, data glove, mouse and the like. The user interface circuitry and user interface software may be configured to facilitate user control of at least some functions of device 612 though use of a display 636. Display 636 may be configured to display at least a portion of a user interface of device 612. Additionally, the display may be configured to facilitate user control of at least some functions of the device (for example, display 636 could be a touch screen).

Software 640 may be stored within memory 634 to provide instructions to processor 628 such that when the instructions are executed, processor 628, device 612 and/or other components of device 612 are caused to perform various functions or methods such as those described herein (for example, as depicted in FIGS. 2A-2E and 3-5). The software may comprise machine executable instructions and data used by processor 628 and other components of computing device 612 and may be stored in a storage facility such as memory 634 and/or in hardware logic in an integrated circuit, ASIC, etc. Software may include both applications and/or services and operating system software, and may include code segments, instructions, applets, pre-compiled code, compiled code, computer programs, program modules, engines, program logic, and combinations thereof.

Memory 634 may include any of various types of tangible machine-readable storage medium, including one or more of the following types of storage devices: read only memory (ROM) modules, random access memory (RAM) modules, magnetic tape, magnetic discs (for example, a fixed hard disk drive or a removable floppy disk), optical disk (for example, a CD-ROM disc, a CD-RW disc, a DVD disc), flash memory, and EEPROM memory. As used herein, a tangible or non-transitory machine-readable storage medium is a physical structure that may be touched by a human. A signal would not by itself constitute a tangible or non-transitory machine-readable storage medium, although other embodiments may include signals or ephemeral versions of instructions executable by one or more processors to carry out one or more of the operations described herein.

As used herein, processor 628 (and any other processor or computer described herein) may include any of various types of processors whether used alone or in combination with executable instructions stored in a memory or other computer-readable storage medium. Processors should be understood to encompass any of various types of computing structures including, but not limited to, one or more microprocessors, special-purpose computer chips, field-programmable gate arrays (FPGAs), controllers, application-specific integrated circuits (ASIC s), hardware accelerators, digital signal processors, software defined radio components, combinations of hardware/firmware/software, or other special or general-purpose processing circuitry.

As used in this application, the term "circuitry" may refer to any of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone, server, or other computing device, to perform various functions) and (c) circuits, such as a microprocessor(s) or a portion of a microprocessor(s), that require software or firmware for operation, even if the software or firmware is not physically present.

These examples of "circuitry" apply to all uses of this term in this application. As an example, as used in this application, the term "circuitry" would also cover an implementation of merely a processor (or multiple processors) or portion of a processor and its (or their) accompanying software and/or firmware. The term "circuitry" would also cover, for example, a radio frequency circuit, a baseband integrated circuit or applications processor integrated circuit for a mobile phone or a similar integrated circuit in a server, a cellular network device, or other network device.

Device 612 or its various components may be mobile and be configured to receive, decode and process various types of transmissions including transmissions in Wi-Fi networks according to a wireless local area network (e.g., the IEEE 802.11 WLAN standards 802.11n, 802.11ac, etc.) and/or wireless metro area network (WMAN) standards (e.g., 802.16), through a specific one or more WLAN transceivers 643, one or more WMAN transceivers 641. Additionally or alternatively, device 612 may be configured to receive, decode and process transmissions through various other transceivers, such as FM/AM Radio transceiver 642, and telecommunications transceiver 644 (e.g., cellular network receiver such as CDMA, GSM, 4G LTE, 5G, etc.). A wired interface 645 (e.g., an Ethernet interface) may be configured to provide communication via a wired communication medium (e.g., fiber, cable, Ethernet, etc.).

Although the above description of FIG. 6 generally relates to a mobile device, other devices or systems may include the same or similar components and perform the same or similar functions and methods. For example, a computer communicating over a wired network connection may include the components or a subset of the components described above, and may be configured to perform the same or similar functions as device 612 and its components. Further base stations or access points as described herein may include the components, a subset of the components, or a multiple of the components (e.g., integrated in one or more servers) configured to perform one or more aspects described herein.

Although specific examples of carrying out the invention have been described, there are numerous variations and permutations of the above-described systems and methods that are contained within the spirit and scope of the invention as set forth in the appended claims.

We claim:

1. A method comprising:
   establishing, by a computing device and using a short wavelength wireless technology, a connection to each of two or more measurement devices, wherein the two or more measurement devices are associated with a wireless network;
   determining, by a computing device, one or more network tests;
   determining, based on the two or more measurement devices and the one or more network tests, one or more measurement device tests;
   based on determining to start the one or more measurement device tests, sending, to the two or more measurement devices, one or more indications of the one or more measurement device tests, wherein the one or more indications cause the two or more measurement devices to perform the one or more measurement device tests based on a common window wherein the common window causes the one or more measurement device tests to be started at each of the two or more measurement devices according to a common starting time;
   receiving, from the two or more measurement devices, test status data that indicates measurement data determined based on performance of the one or more measurement device tests at the two or more measurement devices;
   generating, by the computing device one or more displays that indicate the test status data; and
   performing a verification process that, based on the performance of the one or more measurement tests at the two or more measurement devices, determines whether inaccurate or unreliable data is to be removed from the measurement data.

2. The method of claim 1, wherein the one or more measurement device tests, when performed, cause the two or more measurement devices to determine one or more metrics that indicate a data speed or reliability of a service provided via the wireless network.

3. The method of claim 2, wherein the service comprises a voice call service or a video data service.

4. The method of claim 2, wherein the two or more measurement devices comprise a first measurement device and a second measurement device, wherein the first measurement device is associated with a first measurement device test of the one or more measurement device tests, wherein the second measurement device is associated with a second measurement device test of the one or more measurement device tests, wherein the first measurement device test, when performed, causes the first measurement device to communicate with a base station of the wireless network or with an access point of the wireless network, and wherein the second measurement device test, when performed, causes the second measurement device to communicate with the base station or the access point.

5. The method of claim 1, wherein the short wavelength wireless technology comprises BLUETOOTH, and wherein, for each of the two or more measurement devices, the connection comprises a BLUETOOTH connection.

6. The method of claim 1, wherein the common window causes the one or more measurement device tests to be performed at each of the two or more measurement devices in parallel with each other.

7. The method of claim 1, wherein the one or more network tests comprise a ping test, an upload test, or a download test, and wherein the one or more measurement device tests, when performed, cause the two or more measurement devices to perform the ping test, the upload test, or the download test.

8. The method of claim 1, wherein the one or more network tests comprise a voice call test or a video call test, and wherein the one or more measurement device tests, when performed, cause the two or more measurement devices to perform the voice call test or the video call test.

9. The method of claim 1, wherein the measurement data indicates network performance of the wireless network, and wherein the method further comprises:
determining, based on the measurement data, a ranking that indicates performance of the wireless network relative to at least one other wireless network.

10. The method of claim 1, wherein the measurement data includes first measurement data collected at a first measurement device and second measurement data collected at a second measurement device, and wherein the method further comprises:
determining rules to apply as part of the verification process, wherein the rules include:
a first rule that requires the first measurement data and the second measurement data to be collected within the same geographic area,
a second rule that determines whether the first measurement data or the second measurement data indicates equipment failure, and
a third rule that determines whether the first measurement data or the second measurement data are consistent with each other based on one or more differential thresholds;
wherein the verification process is performed based on the rules; and
wherein the verification process includes removing, from the measurement data, the inaccurate or unreliable data.

11. An apparatus comprising:
one or more processors; and
memory storing executable instructions that, when executed by the one or more processors, cause the apparatus to:
establish, using a short wavelength wireless technology, a connection to each of two or more measurement devices, wherein the two or more measurement devices are associated with a wireless network;
determine one or more network tests;
determine, based on the two or more measurement devices and the one or more network tests, one or more measurement device tests;
based on determining to start the one or more measurement device tests, send, to the two or more measurement devices, one or more indications of the one or more measurement device tests, wherein the one or more indications cause the two or more measurement devices to perform the one or more measurement device tests based on a common window, wherein the common window causes the one or more measurement device tests to be started at each of the two or more measurement devices according to a common starting time;
receive, from the two or more measurement devices, test status data that indicates measurement data determined based on performance of the one or more measurement device tests at the two or more measurement devices;
generate one or more displays that indicate the test status data; and
perform a verification process that, based on the performance of the one or more measurement tests at the two or more measurement devices, analyzes the measurement data and determines whether inaccurate or unreliable data is to be removed from the measurement data.

12. The apparatus of claim 11, wherein the one or more measurement device tests, when performed, cause the two or more measurement devices to determine one or more metrics that indicate a data speed or reliability of a service provided via the wireless network.

13. The apparatus of claim 11, wherein the one or more network tests comprise a ping test, an upload test, or a download test, and wherein the one or more measurement device tests, when performed, cause the two or more measurement devices to perform the ping test, the upload test, or the download test.

14. The apparatus of claim 11, wherein the one or more network tests comprise a voice call test or a video call test, and wherein the one or more measurement device tests, when performed, cause the two or more measurement devices to perform the voice call test or the video call test.

15. The apparatus of claim 11, wherein the measurement data indicates network performance of the wireless network, and wherein the executable instructions, when executed by the one or more processors, cause the apparatus to:
determine, based on the measurement data, a ranking that indicates performance of the wireless network relative to at least one other wireless network.

16. The apparatus of claim 11, wherein the measurement data includes first measurement data collected at a first measurement device and second measurement data collected at a second measurement device, and wherein the executable instructions, when executed by the one or more processors, cause the apparatus to:
determine rules to apply as part of the verification process, wherein the rules include:
a first rule that requires the first measurement data and the second measurement data to be collected within the same geographic area,
a second rule that determines whether the first measurement data or the second measurement data indicates equipment failure, and a third rule that determines whether the first measurement data or the second measurement data are consistent with each other based on one or more differential thresholds;

wherein the verification process is performed based on the rules; and wherein the verification process includes removing, from the measurement data, the inaccurate or unreliable data.

17. One or more non-transitory computer-readable media storing executable instructions that, when executed, cause an apparatus to:

establish, using a short wavelength wireless technology, a connection to each of two or more measurement devices, wherein the two or more measurement devices are associated with a wireless network;

determine one or more network tests;

determine, based on the two or more measurement devices and the one or more network tests, one or more measurement device tests;

based on determining to start the one or more measurement device tests, send, to the two or more measurement devices, one or more indications of the one or more measurement device tests, wherein the one or more indications cause the one or more measurement devices to perform the one or more measurement device tests based on a common window, wherein the common window causes the one or more measurement device tests to be started at each of the two or more measurement devices according to a common starting time;

receive, from the two or more measurement devices, test status data that indicates measurement data determined based on performance of the one or more measurement device tests at the two or more measurement devices;

generate one or more displays that indicate the test status data; and perform a verification process that, based on the performance of the one or more measurement tests at the two or more measurement devices, analyzes the measurement data and determines whether inaccurate or unreliable data is to be removed from the measurement data.

18. The one or more non-transitory computer-readable media of claim 17, wherein the one or more measurement device tests, when performed, cause the two or more measurement devices to determine one or more metrics that indicate a data speed or reliability of a service provided via the wireless network.

19. The one or more non-transitory computer-readable media of claim 17, wherein the measurement data indicates network performance of the wireless network, and wherein the executable instructions, when executed, cause the apparatus to:

determine, based on the measurement data, a ranking that indicates performance of the wireless network relative to at least one other wireless network.

20. The one or more non-transitory computer-readable media of claim 17, wherein the measurement data includes first measurement data collected at a first measurement device and second measurement data collected at a second measurement device, and wherein the executable instructions, when executed, cause the apparatus to:

determine rules to apply as part of the verification process, wherein the rules include:

a first rule that requires the first measurement data and the second measurement data to be collected within the same geographic area, and a second rule that determines whether the first measurement data or the second measurement data indicates equipment failure;

wherein the verification process is performed based on the rules; and wherein the verification process includes removing, from the measurement data, the inaccurate or unreliable data.

* * * * *

UNITED STATES PATENT AND TRADEMARK OFFICE
CERTIFICATE OF CORRECTION

PATENT NO. : 10,951,493 B2  
APPLICATION NO. : 16/428472  
DATED : March 16, 2021  
INVENTOR(S) : Paul P. Carter et al.

Page 1 of 1

It is certified that error appears in the above-identified patent and that said Letters Patent is hereby corrected as shown below:

In the Claims

Column 48, Claim 1, Line 41:
Delete "window" and insert --window,--

Column 48, Claim 1, Line 51:
Delete "device" and insert --device,--

Signed and Sealed this
Tenth Day of August, 2021

Drew Hirshfeld
*Performing the Functions and Duties of the
Under Secretary of Commerce for Intellectual Property and
Director of the United States Patent and Trademark Office*